(12) United States Patent
Shimada et al.

(10) Patent No.: US 6,485,838 B1
(45) Date of Patent: Nov. 26, 2002

(54) COATING COMPOSITION, AND A COATED FILM AND GLASS EACH HAVING A COATING LAYER COMPRISED THEREOF

(75) Inventors: Mibuko Shimada, Mie-ken (JP); Toshinori Sakagami, Kanagawa-ken (JP); Yuichi Hashiguchi, Mie-ken (JP); Hiroshi Shiho, Mie-ken (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/574,070

(22) Filed: May 18, 2000

(30) Foreign Application Priority Data

May 21, 1999 (JP) .......................... 11-142428
Aug. 10, 1999 (JP) .......................... 11-225915

(51) Int. Cl.⁷ ............................ B32B 9/00; C08G 77/24
(52) U.S. Cl. ................. 428/429; 428/428; 428/446; 428/447; 428/448; 428/528; 428/33; 428/34; 428/36; 428/42
(58) Field of Search ................. 428/428, 429, 428/446, 447, 448; 528/33, 34, 36, 42

(56) References Cited

U.S. PATENT DOCUMENTS 4,904,721 A    2/1990  Hanaoka et al.
5,324,566 A *  6/1994  Ogawa et al. .............. 428/141
5,437,894 A *  8/1995  Ogawa et al. .............. 427/535

FOREIGN PATENT DOCUMENTS

| JP | 60-135465 | 7/1985 |
| JP | 64-001769 | 1/1989 |
| JP | 05-345877 | 12/1993 |
| JP | 09-227159 | 9/1997 |
| JP | 09-227161 | 9/1997 |
| JP | 09-235140 | 9/1997 |
| JP | 09-313887 | 12/1997 |

* cited by examiner

*Primary Examiner*—Robert Dawson
*Assistant Examiner*—Michael J Feely
(74) *Attorney, Agent, or Firm*—Oblon, Spivak, McClelland, Maier & Neustadt, P.C.

(57) ABSTRACT

A coated film and a coated glass improved in the resistance to fouling derived from water and oil repellency, and in the durability, the abrasion resistance, and the exfoliation of stacked outer layer, are provided by a specific coating composition having at least one component (a) selected from organosilanes, hydrolyzates of the organosilanes, and condensates of the organosilanes, and component (b) containing a silyl group wherein one of silicon atoms bonded with a hydrolytic group and/or a hydroxy group.

15 Claims, No Drawings

COATING COMPOSITION, AND A COATED FILM AND GLASS EACH HAVING A COATING LAYER COMPRISED THEREOF

FIELD OF THE INVENTION

The present invention relates to a coating composition improved in the resistance to fouling derived from water and oil repellency, the durability and the abrasion resistance, and in the release and exfoliation of stacked outer layer, and to a coated film and glass each having a coating layer comprised thereof.

BACKGROUND OF THE INVENTION

Organosilane coating materials have technically been developed for use as maintenance-free coating materials which are advantageous for the resistance to weather (and sunlight), fouling, and so forth. The demand for improving the performance of organosilane coating materials is overwhelmingly increased. Therefore, it is now desired to provide coating materials which are improved in the coating appearance, the adhesiveness, the resistance to weather, heat, alkalis, organic chemicals, moisture, and (hot) water, the insulating property, the abrasion resistance, the resistance to fouling, and so forth.

Particularly for improving the resistance to fouling, it is known to make the surface of a coating hydrophilic. However, hydrophilization is a treatment to enhance the effect of washing and removing out of contaminants. Therefore, only in the case that the effect of washing overcomes the contamination, the hydrophilized coating shows the resistance to fouling. On the contrary, by the method of imparting the water and oil repellency to the coating layer, it is able to prevent the adhesiveness of both of hydrophilic and lipophilic contaminants. In prior art, addition of oils or surfactants to the coating composition is made in order to impart the water and oil repellency to the coating layer. By the addition of those, it is not able to maintain the abrasion resistance for a long period of time.

Further disclosed are a composition adapted for use as a composition which satisfies the requirements for performance of an organosilane coating material and composed mainly of a partial condensate of organosilane, a dispersion of colloidal silica, and an acrylic resin denatured by a silicone (See Japanese Patent Laid-open Publication (Sho) 60-135465), a composition composed mainly of a condensate of organosilane, a chelate compound of zirconium alkoxide, and a hydrolytic silyl-based vinyl resin (Japanese Patent Laid-open Publication (Sho) 64-1769), and a compound composed mainly of a condensate of organosilane, a colloidal alumina, and a hydrolytic silyl-based vinyl resin (See U.S. Pat. No. 4,904,721).

However, coatings made of the compositions disclosed in (Japanese Patent Laid-open Publication (Sho) 60-135465) and U.S. Pat. No. 4,904,721 have the disadvantage that their glittering property may be declined when they are exposed to ultraviolet light for a considerable length of time. Also, the composition disclosed in (Japanese Patent Laid-open Publication (Sho) 64-1769) is low in the storage stability; it may easily be turned to gel within a short period of time when its solid density is increased.

We, the inventors, have invented a composition for coating which includes a hydrolyzate and/or a partial condensate of organosilane, a vinyl resin having a silyl group wherein silicon atoms are bonded with a hydroxy group and/or a hydrolyzate, a metallic chelate compound, β-diketone and/or β-ketoester (See Japanese Patent Laid-open Publication (Hei) 5-345877). Since this composition has a favorable balance over the coating characteristics required for any organosilane coating material, new coating materials having more improvement in the coating characteristics such as the water and oil repellency and the smoothness of the surface of the coating layer shall be required.

Moreover, a coated film having photocatalytic function is proposed, formed by coating a film substrate. For example, in Japanese Patent Laid-open Publication (Hei) 9-227161, a self-cleaning film having a surface layer containing substantially transparent particles of a photocatalytic metal oxide on a film substrate surface, is disclosed. Also, a photocatalytic sheet having a photocatalytic coating formed on its upper surface and provided at its lower surface with an adhesive coating for attaching to another device or material to offer a photocatalytic function is disclosed in Japanese Patent Laid-open Publication (Hei) 9-313887. However, these coated films or sheets show the resistance to fouling by the highly hydrophilicity derived from photocatalyzation. Therefore, those show the effect only by irradiation and effect of removing out of contaminants only by washing or raining.

Moreover, an anti-fogging window glass having a surface layer provided on a window glass substrate and containing substantially transparent particles of a photocatalytic oxide is disclosed in Japanese Patent Laid-open Publication (Hei) 9-227161. The above glass may however show the effect only by irradiation and watering (raining), and easily fouled by oils because of its lipophilicity.

Also, a coated glass having a surface layer (10 to 200 nm thickness) composed of a photocatalytic metal oxide such as titanium dioxide provided on a glass substrate is disclosed in Japanese Patent Laid-open Publication (Hei) 9-235140. The coated glass is however regarded as inferior to the durability because it is provided without binder. Further, in Japanese Patent Laid-open Publication (Hei) 9-227159, an automobile window glass having a surface layer containing substantially transparent materials of a photocatalytic semiconductor on a glass substrate surface, is disclosed. The window glass is however regarded as inferior to the durability because of containing no binder.

SUMMARY OF THE INVENTION

The present invention has been invented in view of overcoming the foregoing technical drawbacks of the prior arts and its object is to provide a coating composition improved in the resistance to fouling derived from water and oil repellency, the durability and the abrasion resistance, and to a coated film and glass each having a coating layer comprised thereof.

1. A coating composition containing at least one component (a) selected from organosilanes, hydrolyzates of the organosilanes, and condensates of the organosilanes represented by Formula 1

(wherein, $R^1$ is a monovalent organic group having 1 to 8 carbon atoms: when two exist, they are either identical to or different from each other; $R^2$ is an alkyl group having 1 to 5 carbon atoms or an acyl group having 1 to 6 carbon atoms: when two exist, they are either identical to or different from each other; and n is an integer ranging from 0 to 2);

and a polymer component (b) having a silyl group wherein silicon atoms are bonded with a hydrolytic group and/or a hydroxy group (referred to as a fluoropolymer having a silyl group hereinafter);

wherein the component (b) comprises a substance selected from polymers having a structural unit (b-1) expressed by Formula 2 (referred to as structural unit (b-1) hereinafter)

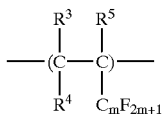
(2)

(wherein, $R^3$ to $R^5$ are $C_mY_{2m+1}$, m is an integer ranging from 0 to 5, and Y is selected from F, H, and Cl separately) and/or a structural unit (b-2) expressed by Formula 3 (referred to as structural unit (b-2) hereinafter)

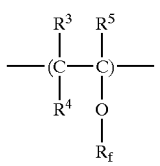
(3)

(wherein, $R_f$ is an alkyl group or an alkoxyalkyl group having fluorine atoms and $R^3$ to $R^5$ are analogous to those in Formula 2 or may be modified without departing from the term of analogy).

2. A coated film having a coating layer comprised of a coating composition according to item 1.

3. A coated film having a coating layer comprised of the composition (i) or (ii), wherein, the composition (i) is a coating composition containing at least one component (a) selected from organosilanes, hydrolyzates of the organosilanes, and condensates of the organosilanes represented by Formula 1

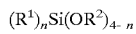
$(R^1)_n Si(OR^2)_{4-n}$ (1)

(wherein, $R^1$ is a monovalent organic group having 1 to 8 carbon atoms: when two exist, they are either identical to or different from each other; $R^2$ is an alkyl group having 1 to 5 carbon atoms or an acyl group having 1 to 6 carbon atoms: when two exist, they are either identical to or different from each other; and n is an integer ranging from 0 to 2), and the composition (ii) is a coating composition containing the component (a) and a polymer component (b') having a silyl group wherein silicon atoms are bonded with a hydrolytic group and/or a hydroxy group; and a coating layer comprised of a coating composition according to item 1 formed thereon.

4. A coated glass having a coating layer comprised of a coating composition according to item 1.

5. A coated glass having a coating layer comprised of the composition (i) or (ii), wherein, the composition (i) is a coating composition containing at least one component (a) selected from organosilanes, hydrolyzates of the organosilanes, and condensates of the organosilanes represented by Formula 1

$(R^1)_n Si(OR^2)_{4-n}$ (1)

(wherein, $R^1$ is a monovalent organic group having 1 to 8 carbon atoms: when two exist, they are either identical to or different from each other; $R^2$ is an alkyl group having 1 to 5 carbon atoms or an acyl group having 1 to 6 carbon atoms: when two exist, they are either identical to or different from each other; and n is an integer ranging from 0 to 2), and the composition (ii) is a coating composition containing the component (a) and a polymer component (b') having a silyl group wherein silicon atoms are bonded with a hydrolytic group and/or a hydroxy group; and a coating layer comprised of a coating composition according to item 1 formed thereon.

DETAILED DESCRIPTION OF THE PREFERRED EMBODIMENTS

The present invention will now be described in a sequence.

Composition (I)

The composition (I) is a coating composition containing the following components (a).

Component (a)

The component (a) is at least a substance selected from organosilanes denoted by Formula 1 (referred to as organosilanes (1) hereinafter), hydrolyzates of the organosilanes (1), and condensates of the organosilanes (1) More specifically, the component (a) may be of one of the three groups or a mixture of any two groups or a mixture of all the three groups.

It should be noted that the hydrolyzate of an organosilane (1) is not limited to a particular one where all the $OR^2$ groups, generally two to four, in the organosilane (1) have been hydrolyzated but may be prepared where one or two or more of the groups have been hydrolyzated or may be a mixture of those groups.

The condensate of an organosilane (1) has a Si—O—Si bond where the silanol group in a hydrolyzate of the organosilane (1) has been condensed. It is not mandatory to condense all the silanol groups. The concept of a condensate of the organosilane (1) according to the present invention includes one where only a few of the silanol groups have been condensed and a mixture of condensates whose levels of condensation are different.

In Formula 1, characteristic examples of the monovalent organic group of $R^1$ containing 1 to 8 carbon atoms are, for example, an alkyl group such as methyl, n-propyl, i-propyl, n-butyl, i-butyl, sec-butyl, t-butyl, n-hexyl, n-heptyl, n-octyl, or 2-ethylhexyl; an acyl group such as acetyl, propionyl, butyryl, valeryl, benzoyl, trioyl, or caproyl; a vinyl group; an aryl group; a cyclohexyl group; a phenyl group; an epoxy group; a glycidyl group; a (meth)acryloxy group; an ureide group; an amide group; a fluoroacetoamide group; an isocyanate group and a fluoroalkyl group as well as their substituent derivatives.

The substituent group in the substituent derivative of $R^1$ maybe selected of a set of halogen atoms, a substituted or not-substituted amino group, a hydroxy group, a mercapto group, an isocyanate group, a glycidoxy group, a 3,4-epoxycyclohexyl group, a (meth)acryloxy group, an ureide group, and an ammino-base. The number of carbon atoms in the substituent derivative of $R^1$ including the carbon atoms in the substituent group is not greater than eight.

When two $R^1$ groups exist in Formula 1, they may be either identical or different.

The alkyl group of $R^2$ containing 1 to 5 carbon atoms may be, for example, methyl, ethyl, n-propyl, i-propyl, n-butyl, i-butyl, sec-butyl, t-butyl, and n-pentyl. The acyl group containing 1 to 6 carbon atoms may be, for example, acetyl, propionyl, butyryl, valeryl, and caproyl.

Two or more of the $R^2$ groups in Formula 1 may be either identical or different from each other.

Characteristic examples of the organosilane (1) are tetra-alkoxysilanes including tetramethoxysilane, tetraethoxysilane, tetra-n-propoxysilane, tetra-i-propoxysilane, and tetra-n-butoxysilane; trialkoxysilane including methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3- aminopropyltriethoxysilane, 2-hydroxyethyl-trimethoxysilane, 2-hydroxyethyl-triethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocianatopropyltrimethoxysilane, 3-isocianatopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl) ethyltriethoxysilane, 3-(meth)-acryloxypropyltrimethoxysilane, 3-(meth)acryloxypropyl-triethoxysilane, 3-ureidopropyltrimethoxysilane, 3-ureidopropyltriethoxysilane, nonafluorohexyl-trimethoxysilane, heptadecafluorodecyltrimethoxysilane, and tridecafluoroctyltrimethoxysilane; dialkoxysilanes including dimethyldirnethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane, diphenyldiethoxysilane, and heptadecafluorodecylmethyldimethoxysilane,; methyltriacetyloxysilane; and dimethyldiacetyloxysilan.

Preferably, it may be selected from trialkoxysilanes and dialkoxysilanes. As for trialkoxysilane, methyltrimethoxysilane, methyltriethoxysilane, 3-glycidoxypropyltrimethoxysilane, 3-glycidoxypropyltriethoxysilane, 3-(meth) acryloxypropyltrimethoxysilane, and 3-(meth) acryloxypropyltriethoxysilane are preferred. As for dialkoxysilane, dimethyldimethoxysilane and dimethyldiethoxysilane are preferred.

According to the present invention, the organosilane (1) may most preferably be trialkoxysilane or a combination of 40 to 95 mol % of trialkoxysilane and 60 to 5 mol % of dialkoxysilane. The use of dialkoxysilane with trialkoxysilane causes the resultant coating layer to be softened and increased in the resistance to alkalis.

The organosilane (1) may directly be used as a hydrolyzate and/or a condensate. The organosilane (1) employed as the hydrolyzate and/or the condensate enables to be utilized as the component (a) when it has been hydrolyzated and condensed. It is more preferable to perform the hydrolytic and condensing action of the organosilane (1) to yield the component (a) by feeding a proper amount of water during the preparation of the composition as a mixture of the organosilane (1) and the other components, as will explicitly be explained later. The amount of water based on the total amount of a structural unit denoted by $(R^1)_n SiO_{(4-n)/2}$ according to the present invention is preferably from 0.5 to 3 moles and more preferably from 0.7 to 2 moles.

When a condensate is used as a component (a), weight-average molecular weight converted as Standard polystyrene (referred to as Mw hereinafter) of the used condensate preferably ranges from 800 to 100,000, more preferably from 1,000 to 50,000.

According to the present invention, the component (a) may be provided as a single substance or a mixture of two or more substances.

The component (a) may either partially or totally include a siloxane oligomer which has SiD bonds and of which the weight-average molecular weight ranges from 300 to 100, 000.

The component (a) is commercially available as MKC silicate manufactured by Mitsubishi Chemical Corporation, an ethyl silicate manufactured by Colcoat Co., a silicon resin manufactured by Toray Industries, Inc./Dow-Corning Co., a silicon resin manufactured by Toshiba Silicones Co., a silicon resin manufactured by Shin-Etsu Chemical Co., Ltd., a hydroxyl contained polydimethylsiloxane manufactured by Dow-Corning Asia Co., and a silicon oligomer manufactured by Nippon Unicar Company Limited. In the present invention, those products may be used directly or after subjected to the condensation.

In the present invention, the component (a) may be provided as a single substance or a mixture of two or more substances.

Component (b) (Fluoropolymer Having a silyl Group)

In the invention, component (b) is a fluoropolymer having a structural unit (b-1) and a structural unit (b-2), in which a silyl group having silicon atoms bonded with a hydrolytic group and/or a hydroxy group (referred to as a specific silyl group hereinafter), preferably, is linked to the end and/or side of a molecular chain of the polymer.

The amount of silicon atoms in the component (b) is generally 0.1 to 60 mol % and preferably 0.5 to 50 mol %, based on the total amount of the component (b2).

A preferable form of the specific silyl group is expressed by Formula 4:

(wherein, X is a hydrolytic group or hydroxy groups of halogen atoms, an alkoxy group, an acetoxy group, a phenoxy group, a thioalkoxy group, or an amino group, $R^6$ is hydrogen atoms, an alkyl group having 1 to 10 carbon atoms, or an aralkyl group having 1 to 10 carbon atoms, and i is an integer ranging from 1 to 3).

The component (b) is preferably obtained by polymerizing a monomer (referred to as a monomer (b-1) hereinafter) having the structure unit denoted by Formula 2 and/or a monomer (referred to as a monomer (b-2) hereinafter) having the structural unit denoted by Formula 3 and a monomer (referred to as a monomer (b-3) hereinafter) wherein a set of silicon atoms are bonded to the hydrolytic group and/or the hydroxy group in the specific silyl group and may further be added with another monomer (referred to as a monomer (b-4) hereinafter) which can copolymerize with the foregoing monomers. The monomer (b-4) may contain fluorine atoms which are absent in the other monomers (b-1) and (b-2)

The component (b) may also be a polymer obtained by polymerizing the monomer (b-1) and/or the monomer (b-2); the polymer may be added with the monomer (b-4), if desired, the polymer is modified by reaction with a silane compound (referred to as a silane compound (b-5) hereinafter) which has a functional group capable of reacting with the hydrolytic group or the hydroxy group.

Monomer (b-1)

The monomer (b-1) is expressed by Formula 2',

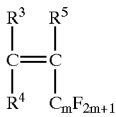

(2')

(wherein, $R^3$ to $R^5$ are $C_mY_{2m+1}$, m is an integer ranging 0 to 5, and Y is selected from F, H, and Cl separately).

The monomer (b-1) may be a compound having a polymerizable unsaturated double bond and at least one fluorine atom.

More particularly, the monomer (b-1) may be selected from:

(A) fluoroethylenes including $CF_2=CF_2$, $CHF=CF_2$, $CH_2=CF_2$, $CH_2=CHF$, $CClF=CF_2$, $CHCl=CF_2$, $CCl_2=CF_2$, $CClF=CClF$, $CHF=CCl_2$, $CH_2=CClF$, and $CCl_2=CClF$;

(B) fluoropropenes including $CF_3CF=CF_2$, $CF_3CF=CHF$, $CF_3CH=CF_2$, $CF_3CF=CH_2$, $CF_3CF=CHF$, $CHF_2CF=CHF$, $CF_3CH=CH_2$, $CH_3CF=CF_2$, $CH_3CH=CF_2$, $CF_3CF=CH_2$, $CF_2ClCF=CF_2$, $CF_2CCl=CF_2$, $CF_3CF=CFCl$, $CF_2ClCCl=CF_2$, $CF_2ClCF=CFCl$, $CF_2CCl=CClF$, $CF_2CCl=CCl_2$, $CCl_3CF=CF_2$, $CF_2ClCCl=CCl_2$, $CFCl_2CCl=CCl_2$, $CF_3CF=CHCl$, $CClF_2CF=CHCl$, $CF_3CCl=CHCl$, $CHF_2CCl=CCl_2$, $CF_2ClCH=CCl_2$, $CF_2ClCCl=CHCl$, and $CCl_3CF=CHCl$; and (C) Fluoroolefines having not smaller than four carbon atoms including $CF_3CF_2CF=CF_2$, $CF_3CF=CFCF_3$, $CF_3CH=CFCF_3$, $CF_2=CFCF_2CHF_2$, $CF_3CF_2CF=CH_2$, $CF_2CH=CHCF_3$, $CF_2=CFCF_2CH_3$, $CF_2=CFCH_2CH_3$, $CF_3CH_2CH=CH_2$, $CF_3CH=CHCH_3$, $CF_2=CHCH_2CH_3$, $CH_3CF_2CH=CH_2$, $CFH_2CH=CHCFH_2$, $CH_3CF_2CH=CH_2$, $CH_2=CFCH_2CH_3$, $CF_3(CF_2)_2CF=CF_2$, and $CF_3(CF_2)_2CF=CF_2$.

The monomer (b-1) having fluorine atoms may be provided in the form of a single monomer or a combination of two or more monomers.

Monomer (b-2)

The monomer (b-2) is expressed by Formula 3',

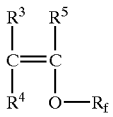

(3')

(wherein, $R_f$ is an alkyl group or an alkoxyalkyl group having fluorine atoms and $R^3$ to $R^5$ are analogous to those of Formula 2' but may be modified without departing from the term of analogy to Formula 2').

The monomer (b-2) may be a compound having a polymerizable unsaturated double bond, an ether bond, and at least one fluorine atom.

More particularly, the monomer (b-2) may be selected from:

(A) (fluoroalkyl) vinyl ether or (fluoroalkoxyalkyl) vinyl ether expressed by $CH_2=CH—O—R_f$ (wherein, $R_f$ is an alkyl group or an alkoxyalkyl group having fluorine atoms);

(B) perfluoroalkyl vinyl ethers including perfluoromethyl vinyl ether, perfuoroethyl vinyl ether, perfluoroprolyl vinyl ether, perfluorobutyl vinyl ether, and perfluoroisobutyl vinyl ether; and (C) perfluoroalkoxyalkyl vinyl ethers including perfluoropropoxypropyl vinyl ether.

The monomer (b-2) having fluorine atoms may be provided in the form of a single monomer or a combination of two or more monomers.

When the two monomers (b-1) and (b-2) are used in a combination, they may preferably be hexafluoropropylene and perfluoroalkyl perfluorovinyl ether or perfluoroalkoxyalkyl perfluorovinyl ether.

Monomer (b-3)

The monomer (b-3) is a monomer having a polymerizable unsaturated double bond in one molecule and silicon atoms bonded to a hydrolytic group and/or a hydroxy group.

The monomer (b-3) maybe an unsaturated silane compound expressed by Formula 4' (referred to as an unsaturated silane compound).

(4')

(wherein, X, $R^6$ and i are analogous to those of Formula 4' and $R^7$ is an organic group having a polymerizable unsaturated double bond).

Characteristic examples of the unsaturated silane compound are:

$CH_2=CHSi(CH_3)(OCH_3)_2$, $CH_2=CHSi(OCH_3)_3$, $CH_2=CHSi(OC_2H_5)_3$, $CH_2=CHSi(CH_3)Cl_2$, $CH_2=CHSiCl_3$, $CH_2=CHCOO(CH_2)_2Si(CH_3)(OCH_3)_2$, $CH_2=CHCOO(CH_2)_2Si(OCH_3)_3$, $CH_2=CHCOO(CH_2)_3Si(CH_3)(OCH_3)_2$, $CH_2=CHCOO(CH_2)_3Si(OCH_3)_3$, $CH_2=CHCOO(CH_2)_2Si(CH_3)Cl_2$, $CH_2=CHCOO(CH_2)_2SiCl_3$, $CH_2=CHCOO(CH_2)_3Si(CH_3)Cl_2$, $CH_2=CHCOO(CH_2)_3SiCl_3$, $CH_2=C(CH_3)COO(CH_2)_2Si(CH_3)(OCH_3)_2$, $CH_2=C(CH_3)COO(CH_2)_2Si(OCH_3)_3$, $CH_2=C(CH_3)COO(CH_2)_3Si(CH_3)(OCH_3)_2$, $CH_2=C(CH_3)COO(CH_2)_3Si(OCH_3)_3$, $CH_2=C(CH_3)COO(CH_2)_2Si(CH_3)Cl_2$, $CH_2=C(CH_3)COO(CH_2)_2SiCl_3$, $CH_2=C(CH_3)COO(CH_2)_3Si(CH_3)Cl_2$, and $CH_2=C(CH_3)COO(CH_2)_3SiCl_3$,

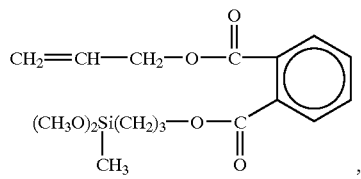

-continued

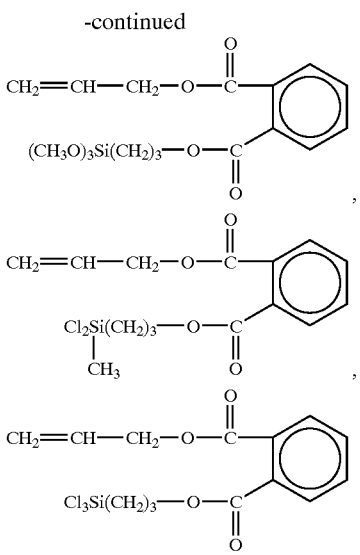

The compound may be provided in the form of a single compound or a combination of two or more compounds.

Monomer (b-4)

The monomer (b-4) capable of copolymerizing with the monomers (b-1) to (b-3) may be selected from:

(A) alkyl (meth)acrylates including methyl (meth)acrylate, ethyl (meth)acrylate, propyl (meth)acrylate, n-butyl (meth)acrylate, i-butyl (meth)acrylate, amyl (meth)acrylate, i-amyl (meth)acrylate, hexyl (meth)acrylate, 2-ethylhexyl (meth)acrylate, n-octyl (meth)acrylate, and cyclohexyl (meth)acrylate;

(B) aromatic vinyl monomers including styrene, α-methylstyrene, 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 3,4-diethylstyrene, 2-chlorostyrene, 3-chlorostyrene, 4-chloro-3-methylstyrene, 4-t-butylstyrene, 2,4-dichlorostyrene, 2,6-dichlorostyrene, and 1-vinylnaphthalene;

(C) hydroxyalkyl(meth)acrylates including hydroxymethyl (meth)acrylate, hydroxyethyl (meth)acrylate, hydroxypropyl (meth)acrylate, hydroxybutyl (meth)acrylate, hydroxyamyl(meth)acrylate, hydroxyhexyl (meth)acrylate, 2-ethylhexyl(meth)acrylate, and n-octyl(meth)acrylate;

(D) epoxy containing monomers including glycidyl(meth)acrylate, and methylglycidyl(meth)acrylate;

(E) multi-functional monomers including divinylbenzene, ethyleneglycol-di(meth)acrylate, diethyleneglycol-di(meth)acrylate, triethyleneglycoldi(meth)acrylate, tetraethyleneglycol-di(meth)acrylate, propyleneglycol-di(meth)acrylate, dipropyleneglycoldi(meth)acrylate, tripropyleneglycol-di(meth)acrylate, tetrapropyleneglycol-di(meth)acrylate, butanedioldi(meth)acrylate, hexanediol-di(meth)acrylate, trimethylolpropane-tri(meth)acrylate, and pentaerythritol-tetra(meth)acrylate;

(F) acid amide compounds including (meth)acrylamide, N-methylol(meth)acrylamide, N-methoxymethyl (meth)acrylamide, N-butoxymethyl (meth)acrylamide, N,N'-methylenebisacrylamide, diacetoneacryleamide, maloamide, and maleimide;

(G) vinyl compounds including vinyl chloride, vinylidene chloride, and vinylesters of fatty acids;

(H) aliphatic conjugated dienes including 1,3-butadiene, 2-methyl-1,3-butadinene, 2,3-dimethyl-1,3-butadiene, 2-neopentyl-1,3-butadinene, 2-chloro-1,3-butadinene, 2-cyano-1,3-butadinene, isoprene, conjugated pentadiene having straight-chain substituted with a substituent group such as an alkyl group, halogen atoms, or a cyano group, and conjugated hexadinene having straight-chain or side-chain;

(I) ethylene type unsaturated carboxylic acids including (meth) acrylic acid, fuumaric acid, itaconic acid, monoalkyl itaconic acids, maleic acid, crotonic acid, and 2-(meth)acryloyloxyethylhexahydrophthalic acid;

(J) vinyl cyanide compounds including acrylonitrile and methacrylonitrile;

(K) piperidine monomers including 4-(meth)acryloyloxy-2,2,6,6,-tetramethylpiperidine, 4-(meth)acryloylamino-2,2,6,6-tetramethylpiperidine, and 4-(meth)acryloyloxy-1,2,2,6,6-pentamethylpiperidine;

(L) vinyl ether monomers including vinyl glycidyl ether, 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 5-hydroxypentyl vinyl ether, and 6-hydroxyhexyl vinyl ether;

(M) allylethers including allyl glycidyl ether, 2-hydroxyethyl allyl ether, 4-hydroxybutyl allyl ether, and glycerol monoallyl ether (N) alkyl vinyl ethers and cycloalkyl vinyl ethers including methyl vinyl ether, ethyl vinyl ether, n-propyl vinyl ether, iso-propyl vinyl ether, n-butyl vinyl ether, iso-butyl vinyl ether, tert-butyl vinyl ether, n-pentyl vinyl ether, n-hexyl vinyl ether, n-octyl vinyl ether, n-dodecyl vinyl ether, 2-ethylhexyl vinyl ether, and cyclohexyl vinyl ether;

(O) fluoro(meth)acrylates including 2,2,2-trifluoroethyl (meth)acrylate, 2,2,3,3,3-pentafluoropropyl(meth)acrylate, 2-(perfluorobuthyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, 2H,1H,5H-octafluoropentyl(meth)acrylate, and 1H,1H,2H,2H-heptadecafluorodecyl(meth)acrylate;

and other substances including dicaprolactone.

This type of the monomers may be provided in the form of a single monomer or a combination of two or more monomers.

Monomer (b-5) (silane compound)

The silane compound (b-5) used in the addition reaction, for example, halogenated silanes including methyldichlorosilane, trichlorosilane, and phenyldichlorosilane; alkoxysilanes including methyldimethoxysilane, methyldiethoxysilane, phenyldimethoxysilane, trimethoxysilane, and triethoxysilane; acyloxysilanes including methyldiacetoxysilane, phenyldiacetoxysilane, and triacetoxysilane.

These silane compounds may be provided as a single compound or a combination of two or more compounds.

The polymerization of producing the component (b) may be implemented by a process of feeding the monomers at once for polymerization, a process of polymerizing some of the monomers and then continuously or intermittently feeding the remaining monomers, or a process of feeding the monomers in succession throughout polymerization. Also, any combination of the polymerizing processes may be employed. Most preferable is a technique of solution polymerization. The solvent used in the solution polymerization is any commonly available solvent and may preferably be selected from ketones, alcohols, and esters. For the polymerization, a polymerizing initiator, a molecular weight modifier, a chelating agent, and an inorganic electrolyte may be selected from common agents.

The amount of a sum of the structural units (b-1) and (b-2) in the component (b) is generally 0.5 to 80 mol % and preferably 1 to 70 mol %, based on the total amount of the component (b). When the amount is lower than 0.5 mol %, the resultant coating layer may hardly be improved in the transparency and the adhesiveness while repelling water and oils. If higher than 80 mol %, the adhesiveness of the coating layer to a substrate may be declined.

The amount of the structural unit (b-1) is preferably 0.5 to 70 mol %, based on the total amount of the component (b). The amount of the structural unit (b-2) is preferably 0.5 to 70 mol %, based on the total amount of the component (b).

With respect to the amount of the structural unit (b-3), the amount of the specific silyl group is generally 0.1 to 60 mol % and preferably 0.5 to 50 mol %, based on the total amount of the component (b). When the amount is lower than 0.1 mol %, the effect of condensation together with the component (a) will hardly be ensured. If higher than 60 mol %, the storage stability of the resultant coating composition will be declined.

The amount of the structural unit (b-4) composed of the monomer (b2-4) capable of copolymerizing with the other monomers is generally not higher than 90 mol % and preferably not higher than 80 mol %, based on the total amount of the component (b).

Mw of the component (b) is preferably 1,000 to 50,000 and more preferably 5,000 to 30,000.

In the invention, the component (b) may be provided in the form of a single substance or a combination of two or more substance as described above.

The amount of the component (b) in the coating composition is generally 20 to 500 weight parts, preferably 25 to 400 weight parts, and more preferably 50 to 300 weight parts, based on 100 weight parts of the structural unit $(R^1)_nSiO_{(4-n)/2}$ in the component (a). When the amount of component (b) is smaller than 20 weight parts, the resultant coating layer will be declined in the resistance to alkalis and cracking. If greater than 500 weight parts, the resistance to weather of the coating layer will be declined.

In the present invention, a vinyl copolymer having the specific silyl group and having no fluorine atoms (referred to as component (b') hereinafter) may be used in addition to the component (b) without impairing the effect of the invention. The component (b') is provided by copolymerization of the foregoing monomers (b-3) and (b-4) or addition reaction of a polymer obtained from the monomer (b-4) with a silane compound (b-5). In the coating composition of the invention, the amount of the component (b') is generally not greater than 500 weight parts, based on 100 weight parts of the structural unit $(R^1)_nSiO_{(4-n)/2}$ of the component (a).

According to the present invention, an organic solvent is used to obtain a uniform mixture of the component (a), the component (c), and the other relevant components (c) to (e), and to have a desired concentration of all solids in the composition. In addition, the organic solvent may assist each of a variety of coating processes and thus increase the dispersion stability and the storage stability of a resultant coating composition.

The organic solvent used for mixing up the components uniformly is of no limitations and may be selected from, for example, alcohols, aromatic hydrocarbons, ethers, ketones, and esters.

The alcohols for the organic solvent include specifically methanol, ethanol, n-propyl alcohol, i-propyl alcohol, n-butyl alcohol, sec-butyl alcohol, t-butyl alcohol, n-hexyl alcohol, n-octyl alcohol, ethylene glycol, diethylene glycol, triethylene glycol, ethylene glycol monobutyl ether, ethylene glycol monoethyl ether acetate, diethylene glycol monoethyl ether, propylene glycol monomethyl ether, propylene monomethyl ether acetate, and diacetone alcohol.

The aromatic hydrocarbons include specifically benzene, toluene, and xylene. The ethers include specifically tetrahydrofuran and 1,4-dioxane. The ketones include specifically acetone, methyl ethyl ketone, methyl isobutyl ketone, and di-isobutyl ketone. The esters include specifically ethyl acetate, propyl acetate, butyl acetate, and propylene carbonate.

The organic solvent may be provided as a single solvent or a combination of two or more solvents.

While coating composition of the invention is able to provide a coating layer improved in the resistance to fouling derived from water and oil repellency, it is favorable to form a undercoating layer on the substrate surface in order to impart the functions of the long-term adhesiveness and shield from ultraviolet ray. Preferable examples of the undercoating composition for a undercoating layer are the compositions (i) and (ii). The composition (i) is more preferable.

The undercoating compositions (i) and (ii) will be explained in detail below.

Composition (i)

The undercoating composition (i) contains the above component (a). For preparing the composition (i), water is added to carry out the hydrolysis and condensation of the organosilane (1) preferably. Further, hydrolyzates and/or condensates of the organosilane (1) can be used as component (a).

Composition (ii)

The undercoating composition (ii) contains the above component (a) and silyl group having polymer (b'). Componet (b') (silyl group having polymer)

The component (b') is a polymer in which no fluorine is contained and a silyl group is linked to the end and/or side of a molecular chain of the polymer. The component (b') in the composition (ii) allows the hydrolytic and/or hydroxy groups in its specific silyl group to be condensed together with the component (a) thus contributing to the improvement in the coating layer characteristics.

The amount of silicon in the component (b') is generally 0.001 to 20 percent by weight and preferably 0.01 to 15 percent by weight, based on the total amount of the component (b').

A preferable form of the specific silyl group is expressed by above Formula 4.

The component (b') (silyl group having polymer) is provided by the method of producing the component (b) (fluoropolymer having a silyl group) while using at least one kind of monomers lacking in fluorine selected from the monomers showed as monomer (b-4) in place of monomers (b-1) and (b-2).

Alternatively, the component (b') may be selected from epoxy resins containing the specific silyl group and polyester resins containing the specific silyl group.

The epoxy resin containing the specific silyl group may be produced by causing the epoxy group in an epoxy resin such as bisphenol A type epoxy resin, bisphenol F type epoxy resin, hydrogenated bisphenol A type epoxy resin, aliphatic poly(glycidyl ether), or aliphatic poly(glycidyl ester) to react with aminosilanes, vinylsilanes, carboxysilanes, or glycidyl-silanes having the specific silyl group.

The polyester resin containing the specific silyl group may be produced by causing the carboxyl group or hydroxy group in a polyester resin to react with aminosilanes, carboxysilanes, or glycidylsilanes having the specific silyl group.

Mw of the component (b') ranges preferably 2,000 to 100,000 and more preferably 4,000 to 50,000.

The amount of the component (b') used in the composition (ii) is generally 2 to 900 weight parts, preferably 10 to 850 weight parts, and more preferably 20 to 800 weight parts, based on 100 weight parts of the structural unit $(R^1)_n SiO_{(4-n)/2}$ in the component (a). In that case, when the amount of component (b') is smaller than 2 weight parts, its resultant coating layer will be declined in the resistance to alkalis. If higher than 900 weight parts, the resistance to weather of the coating layer throughout a long period of time will be lowered.

According to the invention, the component (b') may be provided in the form of a single substance or a combination of two or more substance as described above.

Preferably, the component (b) in the composition (ii) may be condensed together with the component (a) under the presence of water and/or an organic solvent.

The kind and the amount of component (a) in composition (ii) is the same as the above coating composition.

Each of the coating composition of the invention and compositions (i) and (ii) may further be added with the following components (c) to (e) as well as other additives, which will be explained below.

Component (c)

The component (c) is a catalyst for encouraging the hydrolysis and condensation of the components (a), (b) and (b').

The use of the component (c) will accelerate the speed of curing the resultant coating layer and increase the molecular weight of polysiloxane produced by poly condensation of the organosilane component, hence allowing the resultant coating layer to be improved in the physical strength and the long-term durability as well as making the coating layer thickness increased and facilitating the coating application.

The component (c) is preferably selected from acidic compounds, basic compounds, metallic salts, amine compounds, and organometallic compounds and/or their partial hydrolyzates (the organometallic compounds and/or their partial hydrolyzates being referred to as organometallic compounds).

Characteristic examples of the acidic compound are acetic acid, hydrochloric acid, sulfuric acid, phosphoric acid, alkyltitanic acid, p-toluenesulphonic acid, and phthalic acid and it may preferably be acetic acid.

Characteristic examples of the basic compound are sodium hydroxide and potassium hydroxide and it may preferably be sodium hydroxide.

Characteristic examples of the metallic salts are alkali metallic salts of naphthenic acid, octylic acid, nitrous acid, sulfurous acid, aluminic acid and carbonic acid.

Characteristic examples of the amine compound are ethylenediamine, hexamethylenediamine, diethylenetriamine, triethylenetetramine, tetraethylenepentamine, piperidine, piperadine, m-phenylenediamine, p-phenylenediamine, ethanolamine, triethylamine, 3-aminopropyltrimethoxysilane, 3-aminopropyltriethoxysilane, 3-(2-aminoethyl)-aminopropyltrimethoxysilane, 3-(2-aminoethyl)-aminopropyltriethoxysilane, 3-(2-aminoethyl)-aminopropylmethyldimethoxysilane, 3-anilinopropyltrimethoxysilane, alkylamine salts, quaternary ammonium salts, and modified amines used as a hardener for epoxy resin, and preferably it may be 3-aminopropyltrimethoxysilane, 3-aminopropyltriethoxysilane, or 3-(2-aminoethyl)-aminopropyltrimethoxysilane.

The organometallic compound may be selected from a particular compound expressed by Formula 5 shown below (referred to as anorganometallic compound (5) hereinafter), an organometallic compound of tetravalent tin having 1 to 2 alkyl groups where 1 to 10 carbon atoms are bonded to the corresponding number of tin atoms (referred to as an organic tin compound hereinafter), and their hydrolyzates.

$$M(OR^8)_p(R^9COCHCOR^{10})_q \qquad (5)$$

(wherein, M is zirconium, titanium, or aluminum, $R^8$ and $R^9$, different or identical to each other, are monovalent hydrocarbon groups having 1 to 6 carbon atoms such as ethyl, n-propyl, i-propyl, n-butyl, i-butyl, sec-butyl, t-butyl, n-pentyl, n-hexyl, cyclohexyl, or phenyl, $R^{10}$ is a monovalent hydrocarbon group having 1 to 6 carbon atoms, like $R^8$ or $R^9$, or an alkoxyl group having 1 to 16 carbon atoms such as methoxy, ethoxy, n-propoxy, i-propoxy, n-butoxy, sec-butoxy, t-butoxy, lauryloxy, or stearyloxy, and p and q are integers ranging from 0 to 4, (p+q)=(valence of M).)

The organometallic compound (5) may be selected from:

(A) organic zirconium compounds including zirconium tetra-n-butoxide, zirconium tri-n-butoxyethylacetoacetate, zirconium di-n-butoxy-bis(ethylacetoacetate), zirconium n-butoxy-tris(ethylacetoacetate), zirconium tetrakis(n-propylacetoacetate), zirconium tetrakis(acetylacetoacetate), and zirconium tetrakis(ethylacetoacetate);

(B) organic titanium compounds including titanium tetra-i-propoxide, titanium di-i-propoxy bis(ethylacetoacetate), titanium di-i-propoxy bis(acetylacetate), and titanium di-i-propoxy bis(acetylacetone); and (C) organic aluminum compounds including aluminum tri-i-propoxide, aluminum di-i-propoxy ethylacetoacetate, aluminum di-i-propoxy acetylacetonate, aluminum i-propoxy bis(ethylacetoacetate), aluminum 1-propoxy bis(acetylacetonate), aluminum tris(ethylacetoacetate), aluminum tris(acetylacetonate), and aluminum monoacetylacetonate-bis(ethylacetoacetate).

The organometallic compound (5) and its partial hydrolyzate may preferably be selected from zirconium tri-n-butoxy-ethylacetoacetate, titanium di-i-propoxy bis(acetylacetonate), aluminum di-i-propoxy ethylacetoacetate, aluminum tris (ethylacetoacetate), and their partial hydolyzates.

The organic tin compound may be selected from:

carbonic acid organic tin compounds including $(C_4H_9)_2Sn(OCOC_{11}H_{23})_2$, $(C_4H_9)_2Sn(OCOCH=CHCOOCH_3)_2$, $(C_4H_9)_2Sn(OCOCH=CHCOOC_4H_9)_2$, $(C_8H_{17})_2Sn(OCOC_8H_{17})_2$, $(C_8H_{17})_2Sn(OCOC_{11}H_{23})_2$, $(C_8H_{17})_2Sn(OCOCH=CHCOOCH_3)_2$, $(C_8H_{17})_2Sn$ (OCOCH=CHCOOC₄H₉)₂, (C₈H₁₇)₂Sn
(OCOCH=CHCOOC₈H₁₇)₂, (C₈H₁₇)₂Sn
(OCOCH=CHCOOC₁₆H₃₃)₂, (C₈H₁₇)₂Sn
(OCOCH=CHCOOC₁₇H₃₅)₂, (C₈H₁₇)₂Sn
(OCOCH=CHCOOC₁₈H₃₇)₂, (C₈H₁₇)₂Sn
(OCOCH=CHCOOC₂₀H₄₁)₂,

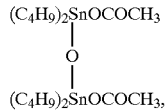

(C₄H₉)Sn(OCOC₁₁H₂₃)₃, and (C₄H₉)Sn(OCONa)₃; mercaptide organic tin compounds including
(C₄H₉)₂Sn(SCH₂COOC₈H₁₇)₂, (C₄H₉)₂Sn
(SCH₂CH₂COOC₈H₁₇)₂, (C₈H₁₇)₂Sn
(SCH₂COOC₈H₁₇)₂, (C₈H₁₇)₂Sn
(SCH₂CH₂COOC₈H₁₇)₂, (C₈H₁₇)₂Sn
(SCH₂COOC₁₂H₂₅)₂, (C₈H₁₇)₂Sn
(SCH₂CH₂COOC₁₂H₂₅)₂, (C₄H₉)Sn
(SCOCH=CHCOOC₈H₁₇)₃, (C₈H₁₇)Sn
(SCOCH=CHCOOC₈H₁₇)₃,

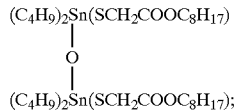

sulfide organic tin compounds including (C₄H₉)Sn=S, (C₈H₁₇)₂Sn=S, and

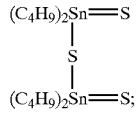

chloride organic compounds including (C₄H₉)SnCl₃, (C₄H₉)₂SnCl₂, (C₈H₁₇)₂SnCl₂, and

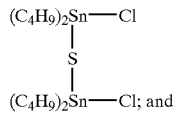

organic tin oxides including (C₄H₉)₂SnO and (C₈H₁₇)₂SnO as well as reaction products produced by the reaction between these organic tin oxide and an ester compound such as ethyl silicate, dimethyl maleate, diethyl maleate, or dioctyl phthalate.

The component (c) maybe provided in the form of a single substance or a combination of two or more substances and may be mixed with a zinc compound or a reaction retardant.

The component (c) may also be fed at a stage for preparation of the composition or at a stage where a coating layer is formed or at both the stages for preparation of the composition and for forming the coating layer.

The amount of the component (c), except the organometallic compounds, based on 100 weight parts of the structural unit, $(R^1)_n SiO_{(4-n)/2}$, in the component (a) is generally 0 to 100 weight parts, preferably 0.01 to 80 weight parts, and more preferably 0.1 to 50 weight parts. The amount of the component (c) of any organometallic compound based on 100 weight parts of the structural unit, $(R^1)_n SiO_{(4-n)/2}$, in the component (a) is generally 0 to 100 weight parts, preferably 0.1 to 80 weight parts, and more preferably 0.5 to 50 weight parts. When the amount of the component (c) exceeds 100 weight parts, the composition will be declined in the storage stability and its resultant coating layer will suffer from cracking.

Component (d)

The component (d) may be at least one expressed by Formula 6 and selected from β-diketones, β-ketoesters, carbonic acid compounds, compounds having two hydroxy groups, amine compounds, and oxyaldehydes.

$$R^9COCH_2COR^{10} \qquad (6)$$

(wherein, $R^9$ and $R^{10}$ are analogous to those in Formula 5).

The component (d) is preferably added when an organometallic compound is used as component (c).

The component (d) serves as a stability enhancing agent for the composition. More specifically, it is presumed that the component (d) is coordinates bonded to metallic atoms in the organometallic compound thus to appropriately control the promotion of co-condensation of the components (a), (b), and (b') with the organometallic compound, hence improving the storage stability of the composition.

Characteristic examples of the component (d) are acetylacetone, methyl acetoacetate, ethyl acetoacetate, n-propyl acetoacetate, i-propyl acetoacetate, n-butyl acetoacetate, sec-butyl acetoacetate, t-butyl acetoacetate, hexane-2,4-dione, heptane-3,5-dione, octane-2,4-dione, nonane-2,4-dione, 5-methylhexane-2,4-dione, malonic acid, oxalic acid, phthalic acid, glycolic acid, salicylic acid, amino acetic acid, imino acetic acid, ethylenediaminetetraacetic acid, glycol, catechol, ethylenediamine, 2,2-bipyridine, 1,10-phenanthroline, diethylenetriamine, 2-ethanolamine, dimethylglyoxime, dithizone, methionine, and salicylaldehyde. It may preferably be acetylacetone or ethyl acetoacetate.

The component (d) maybe provided in the form of a single substance or a combination of two or more substances.

The amount of the component (d) based on 1 mole of the organometallic compound is generally not smaller than 2 moles and preferably 3 to 20 moles. When the amount of the component (d) is smaller than 2 moles, improvement in the storage stability of the resultant composition will be uncertain.

Component (e)

The component (e) is a powder and/or a sol or a colloid form of an inorganic compound having no photocatalytic function and may be fed so that the resultant coating layer has desired properties.

Characteristic examples of the component (e) are $SiO_2$, $Al_2O_3$, AlGaAs, Al(OH)₃, $Sb_2O_5$, $Si_3N_4$, $SnO_2$, Sn—$In_2O_3$, $In_2O_3$, Sb—$In_2O_3$, InSb, InAs, InGaAlP, MgF, $CeF_3$, $CeO_2$, $3Al_2O_3$—$2SiO_2$, BeO, SiC, AlN, Fe, $Fe_2O_3$, Co, Co—$FeO_x$, $CrO_2$, $Fe_4N$, $BaTiO_3$, BaO—$Al_2O_3$—$SiO_2$, Ba ferrite, $SmCO_5$, $YCO_5$, $CeCO_5$, $PrCO_5$, $Sm_2CO_{17}$, $Nd_2Fe_{14}B$, $ZnO_2$, $Al_4O_3$, AlN, SiC, α-Si, $SiN_4$, CoO, $Sb_2O_5$, $MnO_2$, MnB, $Co_3O_4$, $Co_3B$, $LiTaO_3$, MgO, $MgAl_2O_4$, $BeAl_2O_4$, $ZrSiO_4$, ZnO, ZnS, ZnSe, ZnSb, ZnTe, PbTe, PbS, PbSe, GeSi, $FeSi_2$, $CrSi_2$, $CoSi_2$, $MnSi_{1.73}$, $Mg_2Si$, β-B, BaC, BP, $TiB_2$, $ZrB_2$, $HfB_2$, $Ru_2Si_3$, $RuO_2$, $TiO_2$, $TiO_3$, $SrTiO_3$, $FeTiO_3$, $PbTiO_3$, $Al_2TiO_5$, $Zn_2SiO_4$, $Zr_2SiO_4$, $2MgO_2$—$Al_2O_3$—$5SiO_2$, $WO_3$, $Bi_2O_3$, CdO, CdS, CdSe, GaP, GaAs, $CdFeO_3$, $MoS_2$, $LaRhO_3$, GaN, CdP., $Nb_2O_5$, GaAsP, $Li_2O$—$Al_2O_3$—$4SiO_2$, Mg ferrite, Ni ferrite, Ni—Zn ferrite, Li ferrite, and Sr ferrite.

The component (e) may be provided in the form of a single substance or a combination of two or more substances.

The colloidal silica form of the component (e) may commercially be available as, for example, Snowtex, Isopropanol Silicasol, and Methanol Silicasol by Nissan Chemical Industries, Ltd; Cataloid and Oscar by Catalysts & Chemicals Industries Co., LTD; Ludox by Du pont, U.S.A.; Syton by Monsanto, U.S.A., and Nalcoag by Nalco Chemical, U.S.A. The colloidal alumina form of the component (e) may be available asAlminasol-100, and Aluminasol-520 by Nissan Chemical Industries, Ltd.

In order to impart photocatalytic function, the component (e) may include $TiO_2$ (preferably Anatase type). The component (e) may also include $CeO_2$ or $ZnO$ which acts as an ultraviolet ray absorber.

The average particle diameter of the component (e) is preferably 30 $\mu$m or less, more preferably 0.005 to 20 $\mu$m, most preferably 0.005 to 10 $\mu$m. If the average particle diameter is more than 30 $\mu$m, the smoothness of the surface of the coating is not achieved.

The component (e) may also be provided in a powder form, an aqueous sol or colloidal form where the substance is dispersed in water, or a solvent sol or colloidal form where the substance is dispersed in a polar solvent such as isopropyl alcohol or a less-polar solvent such as toluene. The component (e) of the solvent sol or colloidal form may further be diluted with water or the solvent depending on the dispersing properties of the component (e) or may be surface-treated for improving the dispersing properties.

When the component (e) is the aqueous sol or colloidal form, its solid concentration may preferably be not greater than 40 percent by weight.

The method of combining the component (e) with the composition may involve feeding the component (e) after the preparation of the composition or feeding the same during the preparation of the composition to allows the hydrolysis and co-condensation with the components (a), (b), and (b') or their condensates.

The amount of the component (e) based on 100 weight parts of the structural unit, $(R^1)_nSiO_{(4-n)/2}$, in the component (a) is generally 0 to 500 weight parts and preferably 0.1 to 400 weight parts in solid state.

Other Additives

The coating composition of the present invention may be added with the optional components described later.

The coating composition may include an organic ultraviolet ray absorber and a stabilizer. Specific examples of the organic ultraviolet ray absorber are benzophenones, benzotriasols, triadines, and phenols. And specific examples of the stabilizer are hindered amines. These additives may be provided in the form of a single substance or structural unit of a copolymer.

The composition of the present invention may have an appropriate filler added and dispersed for improving the color and the thickness of a resultant coating layer.

The filler may be selected from non-aqueous organic pigments, non-aqueous inorganic pigments, ceramics, metals, and alloys of a particle, fiber, or scale form, and their oxides, hydroxides, carbides, nitrides, and sulfides.

Characteristic examples of the filler are iron, copper, aluminum, nickel, silver, zinc, ferrite, carbon black, stainless steel, silicon dioxide, titanium dioxide for pigment, aluminum oxide, chrome oxide, manganese oxide, iron oxide, zirconium oxide, cobalt oxide, synthetic mullite, aluminum hydroxide, iron hydroxide, silicon carbide, silicon nitride, boron nitride, clay, diatom earth, slaked lime, gypsum, talc, barium carbonate, calcium carbonate, magnesium carbonate, barium sulfate, bentonite, mica, zinc green, chrome green, cobalt green, viridian, Guignet's green, cobalt chrome green, shale green, green soil, manganese green, pigment green, ultramarine, deep blue, pigment blue, rockyblue, cobalt blue, cerulean blue, copper borate, molybdenum blue, copper sulfide, cobalt purple, mars violet, manganese purple, pigment violet, lead suboxide, calciumhydrochloride, zinc yellow, lead sulfide, chrome yellow, yellow soil, cadmium yellow, strontium yellow, titanium yellow, litharge, pigment yellow, copper suboxide, cadmium red, selenium red, chrome vermilion, Indian red, zinc white, antimony white, basic lead sulfate, titanium white, lithopone, lead silicate, zirconium oxide, tungsten white, lead, zinc white, Bantison white, lead phthalate, manganese white, lead sulfate, carbon black, bone black, diamond black, Thermatomic black, plant black, potassium titanate whisker, and molybdenum disulfide.

The filler may be provided in the form of a single substance or a combination of two or more substances.

The amount of the filler based on 100 weight parts of the solids of the composition is generally not greater than 300 weight parts.

Other particular agents to be added to the composition of the present invention, if desired, are known dehydrating agents including methyl orthoformate, methyl orthoacetate, and tetraethoxysilane; dispersing agents including poly (oxyethylene alkyl ether), poly(oxyethylene alkyl phenyl ether), poly(oxyethylene ester of fatty aid), poly(carbonic acid) polymer surfactant, polycarboxylate, polyphosphate, polyacrylate, polyamide ester salt, and polyethylene glycol; thickening agents including cellulose such as methyl cellulose, ethyl cellulose, hydroxyethyl cellulose, hydroxypropyl cellulose, or hydroxypropylmethyl cellulose, castor oil derivative, and ferrosilicate; inorganic foaming agents including ammonium carbonate, ammonium bicarbonate, ammonium subnitrate, sodium boron hydride, and calcium azide; organic foaming agents including an azo compound such as azobisisobutyronitrile, a hydrazine compound such as diphenylsulfone-3,3'-disulfohydrazine, a semicarbazide compound, a triazole compound, and an N-nitroso compound; and other additives including a surfactant, a silane coupling agent, a titanium coupling agent, and a dye.

Also, a leveling agent may be combined for improving the coating performance of the composition. The leveling agent may commercially be available: as a fluorine leveling agent, BM1000 and BM1100 by BM-Chemie, Efca 772 and Efca 777 by Efca Chemicals, a Florence series by Kyoeisha Chemical, an FC series by SUMITOMO 3M LIMITED, and a Fluonal TF series by Toho Chemical; as a silicone leveling agent, a BYK series by BYK Chemie, a Sshmego series by Sshmegmann, and Efca 30, Efca 31, Efca 34, Efca 35, Efca 36, Efca 39, Efca 83, Efca 86, and Efca 88 by Efca Chemicals; and as an ether or ester leveling agent, Carphynol by Nisshin Chemical and Emargen and Homogenol by Kao Corporation.

The use of the leveling agent will improve the appearance of a finished coating layer and also allow the coating layers to be coated uniformly as a thin film.

The amount of the leveling agent to be used, based on the entirety of the component, is preferably 0.01 to 5 percent by weight and more preferably 0.02 to 3 percent by weight.

Further, the composition of the invention may have a fungus resistance agent corresponding to the purpose of application. The fungus resistance agent may be selected from;

(A) metal ion carrying inorganic fungus resistance agents having carrier such as synthetic zeolite, calcium phosphate, zirconium phosphate, vanadium phosphate, calcium silicate, silicagel, amino acids, metal soaps, ceramics, apatite, activated carbon, montmorinite and depolymerized glass, and metals such as silver, copper, and zinc, and (B) organic fungus resistance agents such as phenol ethers, sulfons, imidazols, oxybisphenoxyarsine, organic nitrosulfuric compounds, nitrile compounds, benzothiazole compounds, isothiazole compounds, thiadiazole compounds, triazine compounds, pyrrole compounds, and aliphatic imido compounds.

The composition of the present invention or more particularly, the compositions (i) or (ii) for undercoating may be blended with another resin. Characteristic examples of the another resin are acrylic-urethane resin, epoxy resin, polyester, acrylic resin, fluorine resin, acrylic resin emulsion, epoxy resin emulsion, urethane emulsion, and polyester emulsion.

The composition of the present invention which does not include the component (b'), or the composition (ii) maybe blended with the component (b'), water and/or organic solvent. In this case, the amount of the additional component (b') is the same as above.

The preparation of the coating composition and undercoating composition of the present invention is not limited to a specific mixing method when the two components (c) and (d) are unused. In case that the components (c) and (d) are used, a process may preferably be employed of preparing a mixture of the components (a) to (e) excluding the component (d) and then doping the component (d) into the mixture.

The coating composition of the invention may be produced by the following methods (1) to (4).

(1): A method of adding a specific amount of water to the mixture including organosilane (1) (component (a)), component (b), component (c), and the desired amount of an organic solvent resulting in hydrolyzation and condensation, followed by adding component (d) therein.

(2): A method of adding a specific amount of water to the mixture including organosilane (1) (component (a)) and the desired amount of an organic solvent resulting in hydrolyzation and condensation, followed by adding component (b) and component (c) resulting in condensation, adding component (d) thereafter.

(3): A method of adding a specific amount of water to the mixture including organosilane (1) (component (a)), component (c) and the desired amount of an organic solvent resulting in hydrolyzation and condensation, followed by adding component (b) resulting in partially condensation, adding component (d) thereafter.

(4): A method of adding a specific amount of water to the mixture including, a portion of organosilane (1) (component (a)), component (b), component (c) and the desired amount of an organic solvent, resulting in hydrolyzation and condensation, followed by adding the rest of organosilane (1) resulting in hydrolyzation and condensation, adding component (d) thereafter.

In the present invention, optional components except components (a) to (d) may be added at an appropriate step in preparing the coating composition of the invention.

The concentration of all solids in the coating composition of the present invention is generally 1 to 45 percent by weight, preferably 2 to 40 percent by weight. The solid concentration may be adjusted corresponding to the purpose of application. When the solid concentration in the composition exceeds 45 percent by weight, the storage stability will be declined.

The concentration of all solids in the undercoating composition (i) or (ii) of the present invention is generally not higher than 50 percent by weight, preferably not higher than 40 percent by weight. The solid concentration may be adjusted depending on the type of a substrate, the method of coating, the thickness of a coating layer, and so forth.

Coated Film

The coated film of the present invention consists mainly of a substrate (film)/an undercoating composition (i) or (ii)/a coating composition, or a substrate/a primer/an undercoating composition (i) or (ii)/a coating composition.

The application of any of the compositions of the invention may be conducted by a known manner such as dip coating, flow coating, spraying, screening, electric deposition, vapor deposition, using a brush, a roll coater, a flow coater, a centrifugal coater, an ultrasonic coater, or a (micro) gravure coater.

In forming a layer of the coating composition of the invention on a substrate, the thickness of a coating layer is substantially 0.05 to 20 μm (dried) with single coating application and 0.1 to 40 μm with two times coating application. After dried at an ordinary temperature or heated to 30 to 200° C. commonly for 1 to 60 minutes, the coating layer will set on the substrate of a desired type.

In application of the undercoating composition (i) or (ii), the thickness of a undercoating layer is substantially 0.05 to 20 μm (dried), with single undercoating application and 0.1 to 40 μm with two times undercoating application. After dried at an ordinary temperature or heated to 30 to 200° C. commonly for 1 to 60 minutes, the undercoating layer will set on the substrate of a desired type.

The total thickness of the undercoating and the overcoating layers may normally be 0.1 to 80 μm and preferably 0.2 to 60 μm after drying.

Corresponding to the use, a primer may also be used in the invention. The primer is not limited to a specific type and may be selected from a variety of materials which enable to enhance the bonding between the substrate and the composition, according to the type of the substrate and the purpose of use. The primer may also be provided in the form of a single substance or a combination of two or more substances. The primer may be an enamel containing a coloring material such as a pigment or may have transparency without such a coloring material.

Characteristic examples of the primer are alkyd resin, aminoalkyd resin, epoxy resin, polyester, acrylic resin, urethane resin, fluorine resin, acrylsilicone resin, acrylic resin emulsion, epoxy resin emulsion, polyurethane emulsion, and polyester emulsion. The primer may have various functional radicals when a higher degree of adhesiveness is required between the film substrate and the coating layer in hostile conditions. The functional radicals include, for example, a hydroxy group, a carboxyl group, an amide group, an amine group, a glycidyl group, an alkoxysilyl group, an ether bond, and an ester bond. The primer may also contain an ultraviolet light absorber, an ultraviolet light stabilizer, and so forth.

For increasing the abrasion resistance and the glossiness of the coating layer of the invention, the coating layer may be protected at the upper surface with a clear layer composed of, for example, a siloxane resin paint which may be a stable dispersion of colloidal silica and siloxane resin such as disclosed in U.S. Pat. Nos. 3,986,997 and 4,027,073.

Substrate Film

The substrate film which is able to associate with the composition of the present invention is provided as an organic film selected from polyesters including poly (ethylene terephthalate) (PET), poly(butylene terephthalate) (PBT), and poly(ethylene-2.6-naphthalate) (PEN); polyamides including nylon 6 and nylon 6,6; polyolefins including polyethylene (PE) and polypropylene (PP); polyacryls including polycarbonates (PC) and poly(methacrylate methyl) (PMMA); and ABS resins. The organic film may be a fluorine film such as poly(tetrafluoroethylene) (PTFE) or ethylene-tetrafluoroethylene (ETFE).

The substrate may preliminarily be surface treated for base preparation, improvement in adhesiveness, sealing of porous materials, smoothing, and particular decoration.

Characteristic examples of the surface treatment are blasting, chemical treatment such as alkali treatment, degreasing by a solvent, flaming, oxidation treatment, vapor treatment, corona discharge treatment, UV ozone treatment, ultraviolet radiation, plasma treatment, ion treatment and so forth.

Coated Glass

The coated glass of the present invention consists mainly of a substrate/an undercoating composition (i) or (ii)/a coating composition, or a substrate/a primer/an undercoating composition (i) or (ii)/a coating composition. The application of any of the compositions of the invention may be conducted by the same manner as above coated films.

Substrate Glass

The substrate glass which is able to associate with the composition of the present invention is provided as an inorganic glass such as a clear glass, a green glass, a bronze glass, a tempered glass, a partially tempered glass, a laminated glass, and a glass coated with an ITO conductive film.

The substrate may preliminarily be surface treated for base preparation, improvement in adhesiveness, sealing of porous materials, smoothing, and particular decoration.

The substrate glass of the present invention can be used such as a house window, a front and rear automobile window, a varieties of windows used in a vehicle such as a train, an airplane, a boat, a ship, a top-covered motorcycle, a submarine, a spaceship, a roller coaster, a Ferris wheel; a side and inner mirror of an automobile, a traffic safety mirror set up on the road side, a protection glass used in a device of the generation of electricity such as a protection sheet for a solar cell, a glass used in a monitor, a looking glass, a glass door, and a glass part of a furniture.

With respect to the inorganic glass substrate, characteristic examples of the surface treatment are rubbing, degreasing, metal plating, acid treatment, chroming, flaming, coupling treatment, UV ozone treatment, and so forth.

As set forth above, the coating composition of the present invention enable to provide a coated film and coated glass improved in the resistance to fouling derived from water and oil repellency without declining the adhesiveness, the resistance to weather, heat, alkalis, organic chemicals, moisture, and (hot) water.

EMBODIMENT

The embodiment of the present invention will be described in more detail referring to some examples. It would be understood that the present invention is not limited to the following examples.

The amounts in the examples and their relevant =preparations are denoted in the unit of parts or percent on a weight basis, unless otherwise specified. The measurement and estimation of each characteristic factor was carried out by the following manners.

(1) Mw

A gel permeation chromatography (GPC) method was used under the following conditions.

Test sample: Tetrahydrofuran was used as a solvent. 1 g of a partial condensate of organosilane or 0.1 g of a silyl contained vinyl resin was dissolved in 100 cc of the tetrahydrofran to prepare a test sample. Standard polystyrene: Standard polystyrene made by Pressure Chemical, U.S.A.

Apparatus: A high-temperature, high-speed gel permeation chromatogram (a model, 150-C ALC/GPC) by Waters, U.S.A.

Column: A model, Shodex A-80M (length 50 cm) by SHOW A DENKO K.K., Japan.

Measurement temperature: 40° C.

Flow rate: 1 cc/min.

(2) Storage Stability

The coating composition containing no curing accelerator is stored in a bottle of polyethylene at room temperature for 3 months. Then gelation of the coating composition is examined by visual inspection. Viscosity of the composition showing no gelation is measured by BM type viscometer (manufactured by Tokyo Keiki Co. Ltd.). The composition exhibiting a change in a rate of viscosity not more than 20 percent based on that of the initial composition was classified as "good".

(3) Adhesiveness

A tape peeling test was conducted three times using a matrix (of 100) specified in JIS K5400 and its average was measured.

(4) Hardness

This measurement was based on a pencil hardness specified by JIS K5400.

(5) Resistance to Alkalis

After a coating test piece was immersed in a saturated calcium hydroxide solution for 60 days, its coating layers were examined visually. The test piece exhibiting no change was classified as "good".

(6) Resistance to Organic Chemicals

The coating test piece was applied with 2 cc of isopropyl alcohol, and wiped off after 5 minutes. Then, the test piece was visually examined. The test piece exhibiting no change was classified as "good".

(7) Resistance to Moisture

After a test piece was left at a temperature of 50° C. and a moisture of 95 RH % for 1,000 hours continuously, its coating layers were visually examined. The test piece exhibiting no change was classified as "good".

(8) Resistance to Weather

A 3,000 hours irradiation test with a Sunshine weather meter made by Suga Test was carried out according to JIS K5400 and the coating layers of a test piece were visually examined for the state of appearance (cracking and peeling) The test piece exhibiting no change was classified as "good".

(9) Resistance to Water

After a test piece was immersed in tap water at room temperature for 60 days, the coating layer of a test piece were visually examined for the state of appearance (cracking and peeling). The test piece exhibiting no change was classified as "good".

(10) Resistance to Hot Water

After a test piece was immersed in hot water at 60° C. for 14 days, the coating layers of a test piece were visually examined for the state of appearance (cracking and peeling) The test piece exhibiting no change was classified as "good".

(11) Resistance to Fouling

After the coating layer of a test piece were fouled with a mixture paste of carbon black/kerosine oil=1/2 (in weight ratio), left at room temperatures for 24 hours, and rinsed with water using a sponge, the test piece was visually examined. The evaluation was based on the following criteria.

○: Not fouled.

Δ: Slightly fouled.

×: Terribly fouled.

(12) Transparency

The coating composition is coated on quartz glass obtaining a 10 μm thickness (dried) of the coating layer. The transparency of visible radiation of the coating layer is measured. The evaluation was based on the following criteria.

⊚: Transparency higher than 80%.

○: Transparency between 60 and 80%.

Δ: Transparency smaller than 60%.

(13) Water and Oil Repellency

A slope angle is measured, at which one drop of water or salad oil (manufactured by THE NISSHIN OIL MILLS, LTD.) on the surface of the above obtained coating layer slips down. The evaluation was based on the following criteria.

○: slope angle smaller than 60°.

Δ: slope angle between 60 and 90°.

×: no slip down at a slope angle of 90°.

(14) Contact Angle

A contact angle of 3 μl of pure water or coal tar (industrial coal tar according to JIS K2439) on the above obtained coating layer is measured by an auto-contact angle meter manufactured by Kyowa Kaimen Kagaku Ltd.

(15) Abrasion Resistance

The coating layer is examined by a taper type abrasion testing machine using abrasion ring of cs-10 at a weight of 0.5 kg and at 500 rotation. The difference between the haze of coating layer before test and that of coating layer after test is examined. The evaluation was based on the following criteria.

○: difference smaller than 1.

Δ: difference equal to or smaller than 5.

X: difference greater than 5.

(16) Exfoliation of Stacked Outer Layer

The above coated film is further coated by bisphenol A type epoxy resin to form an outer layer of a thickness of 50 μm. A exfoliation test (of 180°) is conducted according to JIS K6854-3. The evaluation was based on the following criteria.

○: the outer layer is released completely.

Δ: the outer layer is released partially.

×: the outer layer is not released.

Preparation 1 (of the Component (b))

A stainless autoclave equipped with an electromagnetic stirrer was subjected to substitution with a nitrogen gas and filled with 150 parts of methyl isobutyl ketone, 30 parts of ethyl vinyl ether, and 2 parts of lauroyl peroxide (a radical polymerization initiator). The reaction mixture was cooled down to −50° C., and then deoxygenated using nitrogen gas. Then, 65 parts of hexafluoropropylene and 5 parts of vinyl-trimethoxysilane was added to the reaction mixture and it was heated up. When the temperature in the autoclave was increased up to 60° C., the interior pressure was 5 kgf/cm$^2$.

The mixture was stirred for 20 hours at 60° C. to complete the polymerization reaction. When the pressure in the autoclave dropped down to 1.5 kgf/cm$^2$, the mixture was cooled down with water to quench the reaction. The total solid content of the polymer solution was 40% (referred to as (B-1)).

Preparations 2 to 5 (of the Component b).

By the same manner as of Provision 1 except for the monomers used as shown in Table 1, polymer solutions (B-2 to B-5) having a solid concentration of 40% were prepared.

TABLE 1

| Preparation | 1 | 2 | 3 | 4 | 5 |
|---|---|---|---|---|---|
| Polymer | B-1 | B-2 | B-3 | B-4 | B-5 |
| Monomer (b-1), hexafluoropropylene | 65 | — | 20 | 35 | 40 |
| Monomer (b-2), Perfluoromethyl vinyl-ether) | — | 65 | 45 | — | — |
| Monomer (b-3), vinyltrimethoxysilane | 5 | 5 | 5 | 5 | 30 |
| Monomer (b-4), ethyl vinyl ether | 30 | 30 | 30 | 60 | 30 |
| methyl i-butyl ketone | 150 | 150 | 150 | 150 | 150 |
| Solid concentration (%) | 40 | 40 | 40 | 40 | 40 |
| Mw (×10$^4$) | 3.0 | 3.0 | 3.0 | 3.0 | 3.0 |
| Storage stability | good | good | good | good | good |

Preparation 6 (of the Component (b')(Silyl Group Having Polymer))

In a reactor equipped with a circulating cooler and a stirrer, 70 parts of methyl methacrylate, 40 parts of n-butyl acrylate, 20 parts of γ-methacryloxypropyltrimethoxysilane, 7 parts of acrylic acid, 13 parts of 2-hydroxyethyl methacrylate, 150 parts of i-propyl alcohol, 50 parts of methyl ethyl ketone, and 25 parts of methanol were mixed up. The mixture was then heated to 80° C. while being stirred and 4 parts of azobisisovaleronitrile dissolved into 10 parts of xylene was added gradually for 30 minutes. After the reaction mixture was kept at 80° C. for 5 hours, a polymer solution (referred to as (b'-1) hereinafter) having a solid concentration of 40% was obtained.

REFERENCE EXAMPLES 1 to 19 AND COMPARATIVE REFERENCE

EXAMPLES 1 AND 2 (OF THE COATING COMPOSITION)

In a reactor equipped with a stirrer and a circulating cooler, a combination of the components (excluding water and the additive component) listed in Tables 2 to 4 were mixed up. After addition of water, the mixture was stirred for reaction at 60° C. for 5 hours. Then, the additive component was added to the mixture and cooled down to room temperature. The coating compositions (A) to (S) in this invention and comparative coating compositions (a) and (b) having a solid concentration of 20% were prepared. The storage stabilities of the obtained compositions were examined. The evaluation was shown in Tables 2 to 4.

TABLE 2

| Ref. Example | 1 | 2 | 3 | 4 | 5 | 6 | 7 |
|---|---|---|---|---|---|---|---|
| Composition | A | B | C | D | E | F | G |
| Mixture (in parts) | | | | | | | |
| Component (a) | | | | | | | |
| methyltrimethoxy silane | 70 | 70 | 70 | 70 | 70 | 70 | 60 |

TABLE 2-continued

| Ref. Example | 1 | 2 | 3 | 4 | 5 | 6 | 7 |
|---|---|---|---|---|---|---|---|
| dimethyldimethoxy silane | — | — | — | — | — | — | 30 |
| Component (b) | | | | | | | |
| (B-1) | 30 | — | — | — | — | 20 | 10 |
| (B-2) | — | 30 | — | — | — | — | — |
| (B-3) | — | — | 30 | — | — | — | — |
| (B-4) | — | — | — | 30 | — | — | — |
| (B-5) | — | — | — | — | 30 | — | — |
| (b'-1) | — | — | — | — | — | 10 | — |
| Component (c) | | | | | | | |
| Aluminum di(i-propoxy) ethyl-acetoacetate | 5 | 5 | 5 | 5 | 5 | 5 | — |
| Aluminum tris-(ethylaceto acetate) | — | — | — | — | — | — | 7 |
| Solvent | | | | | | | |
| Water | 10 | 10 | 10 | 10 | 10 | 10 | 10 |
| Methyl ethyl ketone | 100 | 100 | 100 | 100 | 100 | 100 | 100 |
| i-propyl alcohol | 40 | 40 | 40 | 40 | 40 | 40 | 40 |
| Additive (in parts) Component (d) | | | | | | | |
| acetylacetone | 5 | 5 | 5 | 5 | 5 | 5 | 5 |
| Mw ($\times 10^4$) | 1.0 | 1.0 | 1.0 | 1.0 | 1.0 | 1.0 | 1.0 |
| Storage stability | good | good | good | good | good | good | good |

TABLE 3

| Ref. Example | 8 | 9 | 10 | 11 | 12 | 13 | 14 |
|---|---|---|---|---|---|---|---|
| Composition Mixture (in parts) | H | I | J | K | L | M | N |
| Component (a) | | | | | | | |
| methyltrimethoxy silane | 30 | 60 | 60 | 60 | 60 | 60 | 60 |
| phenyltrimethoxysilane | — | 10 | — | — | — | — | — |
| α-methacryloxypropyltrimethoxysilane | — | — | 10 | — | — | — | — |
| glycidoxypropyltrimethoxysilane | — | — | — | 10 | — | — | — |
| dimethyldimethoxy silane | — | — | — | — | 10 | — | — |
| polysiloxane having alkoxy group *1 | — | — | — | — | — | 10 | — |
| polysiloxane having hydroxy group *2 | — | — | — | — | — | — | 10 |
| Component (b) | | | | | | | |
| (B-1) | 70 | 30 | 30 | 30 | 30 | 30 | 30 |
| (B-2) | — | — | — | — | — | — | — |
| (B-3) | — | — | — | — | — | — | — |
| (B-4) | — | — | — | — | — | — | — |
| (B-5) | — | — | — | — | — | — | — |
| (b'-1) | — | — | — | — | — | — | — |
| Component (c) | | | | | | | |
| Aluminum di(i-propoxy) ethyl-acetoacetate | 5 | 5 | 5 | 5 | 5 | 5 | 5 |
| Aluminum tris—(ethylacetoacetate) | — | — | — | — | — | — | — |
| Solvent | | | | | | | |
| Water | 10 | 10 | 10 | 10 | 10 | 10 | 10 |
| Methyl ethyl ketone | 100 | 100 | 100 | 100 | 100 | 100 | 100 |
| i-propyl alcohol | 40 | 40 | 40 | 40 | 40 | 40 | 40 |
| Additive (in parts) Component (d) | | | | | | | |
| acetylacetone | 5 | 5 | 5 | 5 | 5 | 5 | 5 |
| Mw ($\times 10^4$) | 1.0 | 1.0 | 1.0 | 1.0 | 1.0 | 1.0 | 1.0 |
| Storage stability | good | good | good | good | good | good | good |

TABLE 4

| Ref. Example | 15 | 16 | 17 | 18 | 19 | Com. 1 | Com. 2 |
|---|---|---|---|---|---|---|---|
| Composition Mixture (in parts) | O | P | Q | R | S | a | b |
| Component (a) | | | | | | | |
| methyltrimethoxy silane | 40 | 70 | 70 | 70 | 70 | 70 | — |
| phenyltrimethoxysilane | — | — | — | — | — | — | — |
| α-methacryloxypropyltrimethoxysilane | — | — | — | — | — | — | — |
| glycidoxypropyltrimethoxysilane | — | — | — | — | — | — | — |
| dimethyldimethoxy silane | 30 | — | — | — | — | 30 | — |
| polysiloxane having alkoxy group *1 | — | — | — | — | — | — | — |
| polysiloxane having hydroxy group *2 | — | — | — | — | — | — | — |
| Component (b) | | | | | | | |
| (B-1) | 30 | 30 | 30 | 30 | 30 | — | 100 |
| (b'-1) | — | — | — | — | — | 50 | — |
| Component (c) | | | | | | | |
| Aluminum di(i-propoxy) ethyl-acetoacetate | 5 | 5 | 5 | 5 | 5 | 5 | 5 |
| Aluminum tris (ethylacetoacetate) | — | — | — | — | — | — | — |
| Solvent | | | | | | | |
| Water | 10 | 10 | 10 | 10 | 10 | 10 | 10 |
| Methyl ethyl ketone | 100 | 100 | 100 | 100 | 100 | 100 | 100 |
| i-propyl alcohol | 40 | 40 | 40 | 40 | 40 | 40 | 40 |
| Additive (in parts) Component (d) | | | | | | | |
| acetylacetone | 5 | 5 | 5 | 5 | 5 | 5 | 5 |
| (ii-1) | — | 100 | — | — | — | — | — |
| (ii-2) | — | — | 100 | — | — | — | — |
| Zinc oxide *3 | — | — | — | 25 | — | 25 | — |
| Anatase type TiO₂ *4 | — | — | — | — | 25 | — | 25 |
| Mw ($\times 10^4$) | 1.0 | 1.0 | 1.0 | 1.0 | 1.0 | 1.0 | 1.0 |
| Storage stability | good | good | good | good | good | good | good |

*1: polysiloxane having alkoxy group on the terminals thereof (Mw = about 1,000)
*2: polysiloxane having hydroxy group on the terminals thereof (Mw = about 6,000)
*3: Zinc oxide (30% concentration in solid) dispersed in toluene,
*4: Anatase type titanium dioxide (30% concentration in solid) dispersed in water (pH 4).

Preparation 7 (of the Undercoating Composition)

In a reactor equipped with a circulating cooler and a stirrer, 70 parts of methyltrimethoxysilane, 30 parts of glycidoxypropyltrimethoxysilane, 20 parts of water, 150 parts of i-propyl alcohol, and 20 parts of aqueous hydrochloric acid of $10^{-2}$ mol/l were mixed up. The mixture was then heated to 60° C. After the reaction mixture was kept at 60° C. for 4 hours, the reaction mixture was cooled to room temperature ,and 20 parts of titanium dioxide (30% concentration in solid) dispersed in toluene were added to obtain a composition (20% concentration in solid). Into 100 parts of the obtained composition, 100 parts of i-propyl alcohol were added. The mixture was stirred, followed by addition of 10 parts of an i-propyl alcohol solution (15% concentration in solid) prepared by a reaction of dibutyldiacetyltin and a silicate oligomer to yield an undercoating composition (i-1).

Preparations 8 to 16 (of the Undercoating Composition)

In a reactor equipped with a stirrer and a circulating cooler, a combination of the components listed in Tables 5 and 6 (excluding additive components) were mixed up and stirred for reaction at 60° C. for 4 hours. Then, the mixture was cooled down to room temperature and added with additive components to prepare a composition having a solid concentration of 20%. With 100 parts of i-propyl alcohol, 100 parts of the prepared composition was mixed and stirred. To the above obtained mixture, 10 parts of an i-propyl alcohol solution (15% concentration in solid) prepared by a reaction of dibutyldiacetyltin and a silicate oligomer were added, to yield undercoating compositions (i-1) to (ii-9).

TABLE 5

| Preparation<br>Composition | 8<br>ii-1 | 9<br>ii-2 | 10<br>ii-3 | 11<br>ii-4 | 12<br>ii-5 |
|---|---|---|---|---|---|
| Mixture (in parts)<br>Component (a) | | | | | |
| methyltrimethoxy silane | 70 | 70 | 70 | 70 | 70 |
| dimethyldimethoxy silane | 30 | — | 30 | 30 | 30 |
| glycidoxypropyl-trimethoxysilane | — | 30 | — | — | — |
| Component (b') | | | | | |
| (b'-1) | 50 | 50 | 150 | 350 | 350 |
| Component (c) | | | | | |
| Aluminum di-i-propoxy) ethyl-acetoacetate | 5 | 5 | 5 | 5 | 5 |
| Solvent | | | | | |
| Water | 10 | 10 | 10 | 10 | 10 |
| i-propyl alcohol | 30 | 30 | 65 | 100 | 100 |
| Ethylene glycol-monobutyl ether | 30 | 30 | 65 | 50 | 50 |
| Methyl ethyl ketone | — | — | — | 50 | 50 |
| Additive (in parts)<br>Component (d) | | | | | |
| acetylacetone | 5 | 5 | 5 | 5 | 5 |
| Component (e) | | | | | |
| Colloidal silica*1 | — | — | — | — | 65 |
| Zinc oxide*2 | 20 | 20 | 40 | 65 | 65 |

TABLE 6

| Preparation<br>Composition | 13<br>ii-6 | 14<br>ii-7 | 15<br>ii-8 | 16<br>ii-9 |
|---|---|---|---|---|
| Mixture (in parts)<br>Component (a) | | | | |
| methyltrimethoxy silane | 70 | 70 | 70 | 70 |
| dimethyldimethoxy silane | 30 | 30 | 30 | 30 |
| Component (b') | | | | |
| (b'-1) | 350 | 350 | 350 | — |
| polyester resin*3 | — | — | — | 700 |
| Component (c) | | | | |
| Aluminum di(i-propoxy) ethyl-acetoacetate | 5 | 5 | 5 | 5 |
| Solvent | | | | |
| Water | 10 | 10 | 10 | 10 |
| i-propyl alcohol | 100 | 100 | 100 | — |
| Ethylene glycol-monobutyl ether | 50 | 50 | 50 | — |
| Methyl ethyl ketone | 50 | 50 | 50 | — |
| Additive (in parts)<br>Component (d) | | | | |
| acetylacetone | 5 | 5 | 5 | 5 |
| Component (e) | | | | |
| Zinc oxide*2 | 65 | 65 | 65 | 65 |
| In—Sn oxide*4 | — | 65 | — | — |
| Benzotriazole | 10 | — | — | — |
| Silver chloride | — | — | 10 | — |

*1: colloidal silica (30% concentration in solid) dispersed in i-propyl alcohol,
*2: Zinc oxide (30% concentration in solid) dispersed in toluene,
*3: polyester resin having a silyl groups, manufactured by Takamatsu Yusi Ltd. (20% concentration in solid),
*4: Indium-Tin oxide (30% concentration in solid) dispersed in i-propyl alcohol.

Preparation 7' (of a Primer)

In a reactor equipped with a circulating cooler, 70 parts of methyltrimethoxysilane, 30 parts of glycidoxypropyltrimethoxysilane, 20 parts of water, 150 parts of i-propyl alcohol, and 20 parts of aqueous hydrochloric acid of $10^{-2}$ mol/l were mixed up. The mixture was then heated to 60° C. After the reaction at 60° C. for 4 hours, 20 parts of titanium dioxide (30% concentration in solid) dispersed in toluene were added to obtain a composition (20% concentration in solid). Into 100 parts of the obtained composition, 100 parts of i-propyl alcohol were added and stirred, followed by addition of 10 parts of an i-propyl alcohol solution (15% concentration in solid) prepared by the reaction between dibutyldiacetyltin and a silicate Noligomer to yield an undercoating composition (p-1').

Preparations 8' to 11' (of the Undercoating Composition)

In a reactor equipped with a stirrer and a circulating cooler, a combination of the components listed in Table 4' (excluding additive components) were mixed up and stirred at 60° C. for 4 hours. Then, the mixture was cooled down to room temperature and additive components were added to the mixture to prepare a composition having a solid concentration of 20%. With 100 parts of i-propyl alcohol, 100 parts of the prepared composition was mixed and stirred, then it was added with 10 parts of an i-propyl alcohol solution (15% concentration in solid) prepared by a reaction of dibutyldiacetyltin and a silicate oligomer to yield the undercoating compositions (i-1') and (ii-1') to (ii-3').

TABLE 4

| Preparation<br>Composition | 8'<br>i-1' | 9'<br>ii-1' | 10'<br>ii-2' | 11'<br>ii-3' |
|---|---|---|---|---|
| Mixture (in parts)<br>Component (a) | | | | |
| tetraethoxysilane | 70 | — | — | — |
| methyltrimethoxy silane | 30 | 70 | 70 | 70 |
| dimethyldimethoxy silane | — | 30 | 30 | 30 |
| Component (b') | | | | |
| (b'-1) | — | 50 | 350 | — |
| Polyester resin*1 | — | — | — | 350 |
| Component (c) | | | | |
| Aluminum di-i-propoxyethyl-acetoacetate | 5 | 5 | 5 | 5 |
| Solvent | | | | |
| Water | 15 | 10 | 10 | 10 |
| i-propyl alcohol | 30 | 30 | 100 | 100 |
| Ethylene glycol monobutyl ether | 30 | 30 | 50 | 50 |
| Methyl ethyl ketone | — | — | 50 | 50 |
| Additive (in parts)<br>Component (d) | | | | |
| acetylacetone | 5 | 5 | 5 | 5 |
| Component (e) | | | | |
| Zinc oxide*2 | — | 15 | 45 | 45 |
| Ti—Zr—Sn oxide*3 | 10 | — | — | — |

*1: polyester resin manufactured by Takamatsu Yusi Ltd. (20% concentration in solid),
*2: Zinc oxide (30% concentration in solid) dispersed in toluene,
*3: Ti—Zr—Sn oxide (30% concentration in solid) dispersed in methanol.

Preparation 17 (of a Primer)

With 80 parts of methyl ethyl ketone and 20 parts of i-propyl alcohol, 100 parts of the polymer solution (b'-1) of Preparation 6 was mixed. Then, the mixture was added with 20 parts of zinc oxide (having 30% of a dispersed-in-toluene solid concentration) adjusted by methyl ethyl ketone to a solid concentration of 20% thus to prepare a primer having 20% of a solid concentration (referred to as (p-1) hereinafter).

EXAMPLES 1 to 42 AND COMPARATIVE EXAMPLES 1 AND 2

Each of the undercoating compositions listed in Tables 7 to 13 was applied to the surface of a 50 μm-thick PET film to have an undercoating of 1 μm in thickness (dried) if necessary. Then a corresponding type of the coating composition was applied to the undercoating to have a coating of 2 μm in thickness (dried). After cured, a resultant coated film was analyzed for a variety of the characteristics. The results are shown in Tables 7 to 13.

TABLE 7

| Example | 1 | 2 | 3 | 4 | 5 | 6 | 7 |
|---|---|---|---|---|---|---|---|
| Undercoating | — | — | — | — | — | — | — |
| Coating | A | B | C | D | E | F | G |
| Adhesiveness (piece/100) | 100 | 100 | 100 | 100 | 100 | 100 | 100 |
| Pencil hardness | 4H | 4H | 4H | 4H | 4H | 4H | 4H |
| Resistance to alkalis | good | good | good | good | good | good | good |
| Resistance to chemicals | good | good | good | good | good | good | good |
| Resistance to moisture | good | good | good | good | good | good | good |
| Resistance to weather | good | good | good | good | good | good | good |
| Resistance to water | good | good | good | good | good | good | good |
| Resistance to hot water | good | good | good | good | good | good | good |
| Resistance to fouling | ○ | ○ | ○ | ○ | ○ | ○ | ○ |
| Transparency | ◉ | ◉ | ◉ | ◉ | ◉ | ◉ | ◉ |
| Oil Repellency | ○ | ○ | ○ | ○ | ○ | ○ | ○ |
| Contact angle of water (°) | 105 | 105 | 105 | 103 | 104 | 105 | 108 |
| Contact angle of oil (°) | 74 | 75 | 75 | 72 | 72 | 74 | 76 |
| Abrasion Resistance | ○ | ○ | ○ | ○ | ○ | ○ | ○ |
| Exfoliation | ○ | ○ | ○ | ○ | ○ | ○ | ○ |

TABLE 8

| Example | 8 | 9 | 10 | 11 | 12 | 13 | 14 |
|---|---|---|---|---|---|---|---|
| Undercoating | — | — | — | — | — | — | — |
| Coating | H | I | J | K | L | M | N |
| Adhesiveness (piece/100) | 100 | 100 | 100 | 100 | 100 | 100 | 100 |
| Pencil hardness | 4H | 4H | 4H | 4H | 4H | 4H | 4H |
| Resistance to alkalis | good | good | good | good | good | good | good |
| Resistance to chemicals | good | good | good | good | good | good | good |
| Resistance to moisture | good | good | good | good | good | good | good |
| Resistance to weather | good | good | good | good | good | good | good |
| Resistance to water | good | good | good | good | good | good | good |
| Resistance to hot water | good | good | good | good | good | good | good |
| Resistance to fouling | ○ | ○ | ○ | ○ | ○ | ○ | ○ |
| Transparency | ◉ | ◉ | ◉ | ◉ | ◉ | ◉ | ◉ |
| Oil Repellency | ○ | ○ | ○ | ○ | ○ | ○ | ○ |
| Contact angle of water (°) | 115 | 106 | 105 | 105 | 103 | 104 | 105 |
| Contact angle of oil (°) | 78 | 76 | 74 | 74 | 72 | 73 | 76 |
| Abrasion Resistance | ○ | ○ | ○ | ○ | ○ | ○ | ○ |
| Exfoliation | ○ | ○ | ○ | ○ | ○ | ○ | ○ |

TABLE 9

| Example | 15 | 16 | 17 | 18 | 19 | 20 | 21 |
|---|---|---|---|---|---|---|---|
| Undercoating | — | — | — | p-1 | ii-1 | ii-2 | ii-3 |
| Coating | O | P | Q | A | A | A | A |
| Adhesiveness (piece/100) | 100 | 100 | 100 | 100 | 100 | 100 | 100 |
| Pencil hardness | 4H | 4H | 4H | 4H | 4H | 4H | 4H |
| Resistance to alkalis | good | good | good | good | good | good | good |
| Resistance to chemicals | good | good | good | good | good | good | good |
| Resistance to moisture | good | good | good | good | good | good | good |
| Resistance to weather | good | good | good | good | good | good | good |
| Resistance | good | good | good | good | good | good | good |

TABLE 9-continued

| Example | 15 | 16 | 17 | 18 | 19 | 20 | 21 |
|---|---|---|---|---|---|---|---|
| to water | | | | | | | |
| Resistance to hot water | good | good | good | good | good | good | good |
| Resistance to fouling | ○ | ○ | ○ | ○ | ○ | ○ | ○ |
| Transparency | ⊙ | ⊙ | ⊙ | ⊙ | ⊙ | ⊙ | ⊙ |
| Oil Repellency | ○ | ○ | ○ | ○ | ○ | ○ | ○ |
| Contact angle of water (°) | 104 | 104 | 103 | 105 | 105 | 105 | 105 |
| Contact angle of oil (°) | 73 | 73 | 73 | 74 | 74 | 74 | 74 |
| Abrasion Resistance | ○ | ○ | ○ | ○ | ○ | ○ | ○ |
| Exfoliation | ○ | ○ | ○ | ○ | ○ | ○ | ○ |

TABLE 10

| Example | 22 | 23 | 24 | 25 | 26 | 27 | 28 |
|---|---|---|---|---|---|---|---|
| Undercoating | ii-4 | ii-5 | ii-6 | ii-7 | ii-8 | ii-9 | ii-6 |
| Coating | A | A | A | A | A | A | F |
| Adhesiveness (piece/100) | 100 | 100 | 100 | 100 | 100 | 100 | 100 |
| Pencil hardness | 4H | 4H | 4H | 4H | 4H | 4H | 4H |
| Resistance to alkalis | good | good | good | good | good | good | good |
| Resistance to chemicals | good | good | good | good | good | good | good |
| Resistance to moisture | good | good | good | good | good | good | good |
| Resistance to weather | good | good | good | good | good | good | good |
| Resistance to water | good | good | good | good | good | good | good |
| Resistance to hot water | good | good | good | good | good | good | good |
| Resistance to fouling | ○ | ○ | ○ | ○ | ○ | ○ | ○ |
| Transparency | ⊙ | ⊙ | ⊙ | ⊙ | ⊙ | ⊙ | ⊙ |
| Oil Repellency | ○ | ○ | ○ | ○ | ○ | ○ | ○ |
| Contact angle of water (°) | 105 | 105 | 105 | 105 | 105 | 105 | 104 |
| Contact angle of oil (°) | 74 | 74 | 74 | 74 | 74 | 74 | 74 |
| Abrasion Resistance | ○ | ○ | ○ | ○ | ○ | ○ | ○ |
| Exfoliation | ○ | ○ | ○ | ○ | ○ | ○ | ○ |

TABLE 11

| Example | 29 | 30 | 31 | 32 | 33 | 34 | 35 |
|---|---|---|---|---|---|---|---|
| Undercoating | ii-6 | ii-6 | ii-6 | ii-6 | ii-6 | ii-6 | ii-6 |
| Coating | G | H | I | J | K | L | M |
| Adhesiveness (piece/100) | 100 | 100 | 100 | 100 | 100 | 100 | 100 |
| Pencil hardness | 4H | 4H | 4H | 4H | 4H | 4H | 4H |
| Resistance to alkalis | good | good | good | good | good | good | good |
| Resistance to chemicals | good | good | good | good | good | good | good |
| Resistance to moisture | good | good | good | good | good | good | good |
| Resistance to weather | good | good | good | good | good | good | good |
| Resistance to water | good | good | good | good | good | good | good |
| Resistance to hot water | good | good | good | good | good | good | good |
| Resistance to fouling | ○ | ○ | ○ | ○ | ○ | ○ | ○ |
| Transparency | ⊙ | ⊙ | ⊙ | ⊙ | ⊙ | ⊙ | ⊙ |
| Oil Repellency | ○ | ○ | ○ | ○ | ○ | ○ | ○ |
| Contact angle of water (°) | 108 | 115 | 106 | 105 | 105 | 103 | 104 |
| Contact angle of oil (°) | 76 | 78 | 76 | 74 | 74 | 72 | 73 |
| Abrasion Resistance | ○ | ○ | ○ | ○ | ○ | ○ | ○ |
| Exfoliation | ○ | ○ | ○ | ○ | ○ | ○ | ○ |

TABLE 12

| Example | 36 | 37 | 38 | 39 | 40 | 41 | 42 |
|---|---|---|---|---|---|---|---|
| Undercoating | ii-6 | ii-6 | ii-6 | ii-6 | ii-1' | ii-2' | ii-3' |
| Coating | N | O | P | Q | A | A | A |
| Adhesiveness (piece/100) | 100 | 100 | 100 | 100 | 100 | 100 | 100 |
| Pencil hardness | 4H | 4H | 4H | 4H | 4H | 4H | 4H |
| Resistance to alkalis | good | good | good | good | good | good | good |
| Resistance to chemicals | good | good | good | good | good | good | good |
| Resistance to moisture | good | good | good | good | good | good | good |
| Resistance to weather | good | good | good | good | good | good | good |
| Resistance to water | good | good | good | good | good | good | good |
| Resistance to hot water | good | good | good | good | good | good | good |
| Resistance to fouling | ○ | ○ | ○ | ○ | ○ | ○ | ○ |
| Transparency | ⊙ | ⊙ | ⊙ | ⊙ | ⊙ | ⊙ | ⊙ |
| Oil Repellency | ○ | ○ | ○ | ○ | ○ | ○ | ○ |
| Contact angle of water (°) | 105 | 104 | 104 | 103 | 105 | 105 | 105 |
| Contact angle of oil (°) | 76 | 73 | 73 | 73 | 74 | 74 | 74 |
| Abrasion Resistance | ○ | ○ | ○ | ○ | ○ | ○ | ○ |
| Exfoliation | ○ | ○ | ○ | ○ | ○ | ○ | ○ |

TABLE 13

| Com. Example | 1 | 2 |
|---|---|---|
| Undercoating | ii-2 | ii-2 |
| Coating | a | b |
| Adhesiveness (piece/100) | 100 | 80 |
| Pencil hardness | 2H | 2H |
| Resistance to alkalis | good | good |
| Resistance to chemicals | good | good |
| Resistance to moisture | good | good |
| Resistance to weather | good | not good |
| Resistance to water | good | good |
| Resistance to hot water | good | good |
| Resistance to fouling | ○ | Δ |
| Transparency | ⊙ | ⊙ |
| Oil Repellency | Δ | Δ |
| Contact angle of water (°) | 95 | 120 |
| Contact angle of Oil (°) | 50 | 71 |
| Abrasion Resistance | x | x |
| Exfoliation | x | ○ |

EXAMPLES 1' TO 16' AND COMPARATIVE EXAMPLES 1' AND 2'

Each of the undercoating compositions listed in Tables 5' to 8' was applied to the surface of a 5 mm-thick glass plate to have an undercoating of 0.5 μm in thickness (dried) if necessary. Then, a corresponding type of the coating composition was applied to the undercoating to have a coating of 1 μm in thickness (dried). After cured, a resultant coated glass was analyzed for a variety of the characteristics. The results are shown in Tables 5' to 8'.

TABLE 5'

| Example | 1' | 2' | 3' | 4' | 5' | 6' |
|---|---|---|---|---|---|---|
| Undercoating | — | — | — | — | — | — |
| Coating | A | F | G | I | J | K |
| Adhesiveness (piece/100) | 100 | 100 | 100 | 100 | 100 | 100 |
| Pencil hardness | 4H | 4H | 4H | 4H | 4H | 4H |
| Resistance to alkalis | good | good | good | good | good | good |
| Resistance to chemicals | good | good | good | good | good | good |
| Resistance to moisture | good | good | good | good | good | good |
| Resistance to weather | good | good | good | good | good | good |
| Resistance to fouling | ○ | ○ | ○ | ○ | ○ | ○ |
| Transparency | ⊚ | ⊚ | ⊚ | ⊚ | ⊚ | ⊚ |
| Oil Repellency | ○ | ○ | ○ | ○ | ○ | ○ |
| Contact angle of water (°) | 105 | 104 | 108 | 106 | 105 | 106 |
| Contact angle of oil (°) | 74 | 74 | 76 | 76 | 74 | 74 |
| Abrasion Resistance | ○ | ○ | ○ | ○ | ○ | ○ |
| Exfoliation | ○ | ○ | ○ | ○ | ○ | ○ |

TABLE 6'

| Example | 7' | 8' | 9' | 10' | 11' | 12' |
|---|---|---|---|---|---|---|
| Undercoating | — | — | — | — | — | i-1' |
| Coating | L | M | N | O | P | A |
| Adhesiveness (piece/100) | 100 | 100 | 100 | 100 | 100 | 100 |
| Pencil hardness | 4H | 4H | 4H | 4H | 4H | 4H |
| Resistance to alkalis | good | good | good | good | good | good |
| Resistance to chemicals | good | good | good | good | good | good |
| Resistance to moisture | good | good | good | good | good | good |
| Resistance to weather | good | good | good | good | good | good |
| Resistance to fouling | ○ | ○ | ○ | ○ | ○ | ○ |
| Transparency | ⊚ | ⊚ | ⊚ | ⊚ | ⊚ | ⊚ |
| Oil Repellency | ○ | ○ | ○ | ○ | ○ | ○ |
| Contact angle of water (°) | 103 | 104 | 105 | 104 | 104 | 105 |
| Contact angle of oil (°) | 72 | 73 | 76 | 73 | 73 | 74 |
| Abrasion Resistance | ○ | ○ | ○ | ○ | ○ | ○ |
| Exfoliation | ○ | ○ | ○ | ○ | ○ | ○ |

TABLE 7'

| Example | 13' | 14' | 15' | 16' | Com. 1' | Com. 2' |
|---|---|---|---|---|---|---|
| Undercoating | i-1' | i-1' | i-1' | i-1' | ii-2' | ii-2' |
| Coating | F | G | O | P | a | b |
| Adhesiveness (piece/100) | 100 | 100 | 100 | 100 | 100 | 100 |
| Pencil hardness | 4H | 4H | 4H | 4H | 2H | 2B |
| Resistance to alkalis | good | good | good | good | good | good |
| Resistance to chemicals | good | good | good | good | good | good |
| Resistance to moisture | good | good | good | good | good | good |
| Resistance to weather | good | good | good | good | good | not good |
| Resistance to water | good | good | good | good | good | good |
| Resistance to hot water | good | good | good | good | good | good |
| Resistance to fouling | ○ | ○ | ○ | ○ | ○ | Δ |
| Transparency | ⊚ | ⊚ | ⊚ | ⊚ | ⊚ | ⊚ |
| Oil Repellency | ○ | ○ | ○ | ○ | Δ | Δ |
| Contact angle of water (°) | 104 | 108 | 104 | 104 | 95 | 120 |
| Contact angle of oil (°) | 74 | 76 | 73 | 73 | 50 | 71 |
| Abrasion Resistance | ○ | ○ | ○ | ○ | X | X |
| Exfoliation | ○ | ○ | ○ | ○ | ○ | ○ |

EXAMPLES 43 TO 50

Each of the undercoating compositions was applied to the corresponding substrate (films) listed in Table 14 and dried to have an undercoating of 2 μm in thickness (dried), if necessary. Then, a coating composition of the invention was applied to the undercoating to have a coating of 2 μm in thickness (dried). After cured, a resultant coated films was analyzed for a variety of the characteristics.

The results are shown in Table 14.

TABLE 14

| Ex. | Substrate (film) | Undercoating Composition | Coating Composition | Adhesiveness | Resistance to weather | Resistance to fouling |
|---|---|---|---|---|---|---|
| 43 | PET*1 | — | A | 100 | good | ○ |
| 44 | PET*2 | i-1 | A | 100 | good | ○ |
| 45 | PC | b'-1 | A | 100 | good | ○ |
| 46 | acrylic resin | b'-1 | A | 100 | good | ○ |
| 47 | PVC*3 | ii-9 | A | 100 | good | ○ |
| 48 | PP*4 | ii-9 | A | 100 | good | ○ |
| 49 | PTFE | b'-1 | A | 100 | good | ○ |
| 50 | ETFE | b'-1 | A | 100 | good | ○ |

*1: surface treated by acrylic resin
*2: surface treated by a silanol group
*3: vinyl chloride resin
*4: polypropylene resin

Effect of the Invention

The invention enables to provide a coated film and coated glass improved in the storage stability and the resistance to coating composition according to the present fouling without declining the adhesiveness, the resistance to weather, heat, alkalis, organic chemicals, moisture, and (hot) water. Because of the excellent resistance to fouling derived from water and oil repellency and hardness, the above coated film and coated glass are favorably able to maintain good appearance for a long period of time, therefore they may be used as maintenance free coated film and coated glass. The surface of the coating layer containing the coating composition of the invention is excellent in removing and exfoliating of stacked outer layer. Therefore, the coating composition of the invention is used as the exfoliation coating.

The coated film of the invention can successfully be used preferably as a window film or more particularly as an automobile window film, a structure or house window film, a protective film, an UV barrier film, and an anti-fogging film. Further, it can be applied to a surface of an inner wall and outer wall of architectures, a furniture, a lamp, a kitchen range hood, a ventilating fan, a kitchen panel, an interior material used for bathroom, a domestic architecture equipment such as sanitary wares, an automobile part such as a body and a window, office goods, and a toy. Also, the coated film of the invention is available for the exfoliation coating.

The coated glass of the invention can successfully be used preferably such as a house window, an automobile window, a structure or house window, a protective glass, an UV barrier glass, and an anti-fogging glass.

What is claimed is:

1. A coating composition containing at least one component (a) selected from organosilanes, hydrolyzates of the organosilanes, and condensates of the organosilanes represented by Formula 1

$$(R^1)_n Si(OR^2)_{4-n} \tag{1}$$

(wherein, $R^1$ is a monovalent organic group having 1 to 8 carbon atoms: when multiple $R^1$s exist, they are either identical to or different from each other; $R^2$ is an alkyl group having 1 to 5 carbon atoms or an acyl group having 1 to 6 carbon atoms: when multiple $R^2$s exist, they are either identical to or different from each other; and n is an integer ranging from 0 to 2);

and a polymer component (b) having a molecular weight Mw of at least 5000, and having a silyl group wherein silicon atoms are bonded with a hydrolytic group and/or a hydroxy group;

wherein the component (b) comprises a substance selected from polymers having a structural unit (b-1) expressed by Formula 2

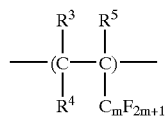

(2)

(wherein, $R^3$ to $R^5$ are $C_m Y_{2m+1}$, m is an integer independently ranging from 0 to 5, and Y is selected from F, H, and Cl separately) and/or a structural unit (b-2) expressed by Formula 3

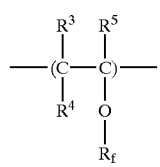

(3)

(wherein, $R_f$ is an alkyl group or an alkoxyalkyl group having fluorine atoms and $R^3$ to $R^5$ have the same meaning as above).

2. A coated film having a coating layer comprised of a coating composition according to claim 1.

3. The coated film according to claim 2, wherein the sum of the structural units (b-1) and (b-2) is about 0.5 to 80 mol % based on the total amount of component (b).

4. The coated film according to claim 2, wherein component (b) has a molecular weight of 5,000 to 50,000.

5. A coated film having a coating layer comprised of the composition (i) or (ii), wherein, the composition (i) is a coating composition containing at least one component (a') selected from organosilanes, hydrolyzates of the organosilanes, and condensates of the organosilanes represented by Formula 1

$$(R^1)_n Si(OR^2)_{4-n} \tag{1}$$

(wherein, $R^1$ is a monovalent organic group having 1 to 8 carbon atoms: when multiple $R^1$s exist, they are either identical to or different from each other; $R^2$ is an alkyl group having 1 to 5 carbon atoms or an acyl group having 1 to 6 carbon atoms: when multiple $R^2$s exist, they are either identical to or different from each other; and n is an integer ranging from 0 to 2), and the composition (ii) is a coating composition containing the component (a') and a polymer component (b') having a silyl group wherein silicon atoms are bonded with a hydrolytic group and/or a hydroxy group;

and a coating layer comprised of a coating composition according to claim 1 formed thereon.

6. The coated film according to claim 5, wherein the sum of the structural units (b-1) and (b-2) is about 0.5 to 80 mol % based on the total amount of component (b).

7. The coated film according to claim 5, wherein component (b) has a molecular weight of 5,000 to 50,000.

8. A coated glass having a coating layer comprised of a coating composition according to claim 1.

9. The coated glass according to claim 8, wherein the sum of the structural units (b-1) and (b-2) is about 0.5 to 80 mol % based on the total amount of component (b).

10. The coated glass according to claim 8, wherein component (b) has a molecular weight of 5,000 to 50,000.

11. A coated glass having a coating layer comprised of the composition (i) or (ii), wherein, the composition (i) is a coating composition containing at least one component (a') selected from organosilanes, hydrolyzates of the organosilanes, and condensates of the organosilanes represented by Formula 1

$$(R^1)_n Si(OR^2)_{4-n} \tag{1}$$

(wherein, $R^1$ is a monovalent organic group having 1 to 8 carbon atoms: when multiple $R^1$s exist, they are either identical to or different from each other; $R^2$ is an alkyl group having 1 to 5 carbon atoms or an acyl group having 1 to 6 carbon atoms: when multiple $R^2$s exist, they are either identical to or different from each other; and n is an integer ranging from 0 to 2), and the composition (ii) is a coating composition containing the component (a') and a polymer component (b') having a silyl group wherein silicon atoms are bonded with a hydrolytic group and/or a hydroxy group;

and a coating layer comprised of a coating composition according to claim 1 formed thereon.

12. The coated glass according to claim 11, wherein the sum of the structural units (b-1) and (b-2) is about 0.5 to 80 mol % based on the total amount of component (b).

13. The coated glass according to claim 11, wherein component (b) has a molecular weight of 5,000 to 50,000.

14. The coating composition according to claim 1, wherein the sum of the structural units (b-1) and (b-2) is about 0.5 to 80 mol % based on the total amount of component (b).

15. The coating composition according to claim 1, wherein component (b) has a molecular weight of 5,000 to 50,000.

* * * * *